US010899420B2

(12) United States Patent
Oestrem et al.

(10) Patent No.: US 10,899,420 B2
(45) Date of Patent: Jan. 26, 2021

(54) CONDITIONAL ONLINE-BASED RISK ADVISORY SYSTEM (COBRAS)

(71) Applicant: Marine Technologies LLC, Mandeville, LA (US)

(72) Inventors: Tor Eirik Oestrem, Covington, LA (US); Kjell Erik Larsen, Mandeville, LA (US)

(73) Assignee: Marine Technologies, LLC, Mandeville, LA (US)

( * ) Notice: Subject to any disclaimer, the term of this patent is extended or adjusted under 35 U.S.C. 154(b) by 0 days.

(21) Appl. No.: 16/135,825

(22) Filed: Sep. 19, 2018

(65) Prior Publication Data

US 2019/0084657 A1 Mar. 21, 2019

Related U.S. Application Data

(60) Provisional application No. 62/560,189, filed on Sep. 19, 2017.

(51) Int. Cl.
*G08B 23/00* (2006.01)
*B63B 45/04* (2006.01)
(Continued)

(52) U.S. Cl.
CPC .............. *B63B 45/04* (2013.01); *B63B 71/00* (2020.01); *G05B 23/0232* (2013.01);
(Continued)

(58) Field of Classification Search
None
See application file for complete search history.

(56) References Cited

U.S. PATENT DOCUMENTS

| 4,334,425 A | 6/1982 | Crane | |
|---|---|---|---|
| 2002/0029120 A1* | 3/2002 | Degani | ................ A61B 5/0263 |
| | | | 702/100 |

(Continued)

FOREIGN PATENT DOCUMENTS

| WO | 2012016155 A1 | 2/2012 |
|---|---|---|
| WO | 2017129859 A1 | 8/2017 |

OTHER PUBLICATIONS

International Search Report and Written corresponding to PCT Application No. PCT/US2018/051745, dated Nov. 19, 2018.

*Primary Examiner* — Julie B Lieu
(74) *Attorney, Agent, or Firm* — Foley & Lardner LLP

(57) ABSTRACT

An advisory system of a vessel that monitors variables of a vessel system inclusive of systems and subsystems that are used to operate the vessel. The advisory system may use machine-learning to learn from an operator (i) whether or not two variables are related to one another, and (ii) likelihood that a variable will reach a threshold, and, optionally, time until reaching the threshold. The system may receive operator feedback (i) to indicate whether the two variables are related to one another, and (ii) whether a behavior of the variable is normal or not normal. Thereafter, if a determination that the same two variables are related to one another and behaving in a similar manner, provide notification to the operator of the behavior. In response to determining that the variable is behaving (e.g., trending) in a similar manner that is not normal, providing a notification to the operator.

32 Claims, 13 Drawing Sheets

(51) Int. Cl.
*G07C 5/00* (2006.01)
*G07C 5/08* (2006.01)
*G05B 23/02* (2006.01)
*B63B 71/00* (2020.01)
*B63B 79/00* (2020.01)

(52) U.S. Cl.
CPC ......... *G05B 23/0283* (2013.01); *G07C 5/006* (2013.01); *G07C 5/0808* (2013.01); *G07C 5/0816* (2013.01); *B63B 79/00* (2020.01); *B63B 2201/26* (2013.01); *G05B 2219/45071* (2013.01)

(56) References Cited

U.S. PATENT DOCUMENTS

| | | | |
|---|---|---|---|
| 2007/0162190 A1* | 7/2007 | Choubey | G05B 23/0283 700/290 |
| 2008/0262795 A1* | 10/2008 | Webb | G05B 19/41875 702/184 |
| 2016/0042541 A1* | 2/2016 | Nixon | G06T 11/206 715/771 |
| 2019/0302310 A1* | 10/2019 | Fox | G01V 1/282 |

* cited by examiner

CONDITIONAL ONLINE-BASED RISK ADVISORY SYSTEM (COBRAS)

RELATED APPLICATIONS

This application claims priority to U.S. Provisional Application having Ser. No. 62/560,189 filed on Sep. 19, 2017; the contents of which are hereby incorporated by reference in their entirety.

BACKGROUND OF THE INVENTION

Vessels, such as marine vessels that transport cargo, drilling vessels, subsea vessels (such as ROVs), research vessels, or any other marine vessels, have many mechanical and electrical systems and subsystems (e.g., engines, electrical systems, mechanical systems, electromechanical systems, hydraulic systems, communications systems, sensors, and so forth) (hereinafter "vessel system") that are used to control and operate the vessels. Operators of these vessels rely on the vessel system and sub-systems to remain in good working order so that minimal downtime of the vessels occur. The vessel system has operating parameters within which the vessel system operates properly. However, as a result of normal wear-and-tear of the vessels over time, the vessel system needs to be maintained to avoid potential catastrophic failure that could incapacitate or impact operation of the vessel.

In most cases, the vessel system has many sensors that are used to sense various operating parameters (e.g., pressures, temperatures, force, etc.) of the vessel system. The sensors generate sensor signals that are generally available to operators via one or more user interfaces at the helm of a vessel in one form or another. For example, in the event of an operating parameter crossing a threshold level sensed by a sensor, the sensor signals are used to trigger a notification in the form of an audible and/or visual indicator to the operator. One problem that exists is that a vessel system may have hundreds or thousands of parameters or variables, which results in an operator generally managing operations in a reactionary mode when indicators show signs of problems (e.g., sensor signals that indicate overheating, pressure changes, fluid leaks, power drops, etc.). Because of the overwhelming number of variables and limited number of available indicators displayable on a user interface, an operator's ability to monitor each of the indicators to track operations of each of the systems is not possible. Moreover, nominal levels of variables of a vessel system may be difficult to track by operators, and environmental conditions, such as outside temperature, water temperature, wave conditions, etc. may impact the variables in a way that an operator may not be able to track, thereby not being identified or addressed until a near failure or actual failure occurs. As such, there is a need for a more proactive system that can help an operator manage watch of each of the systems.

SUMMARY OF THE INVENTION

A conditional online-based risk advisory system (COR-BAS) ("advisory system") may provide for monitoring and sending notifications and alerts to a user about abnormalities of a vessel system, including engines, electrical systems, mechanical systems, electromechanical systems, hydraulic systems, communications systems, sensors, and so on ("vessel system") of a vessel on which the advisory system is operating, or another vessel system, to provide a proactive and efficient operation of a vessel system. The advisory system may also provide optimizations to reduce costs and increase time of operation. The advisory system utilizes a machine learning system, as the system may learn from the user so as to become more knowledgeable over time. From the machine learning, the advisory system may maintain monitoring of the vessel system, but limit (i) false positive and false negative notifications and (ii) alarms and verification communications with the user or operator.

In an embodiment, the advisory system may be configured to (i) continuously monitor variables of the vessel system, (ii) provide an automatic and rapid advisory in the event of approaching system limits of variable(s), (iii) report vessel system health, trending, and status information, (iv) present vessel system statistics, (v) provide indicators and/or directives (e.g., green (nominal), yellow (warning) and red (alarm)) for operations, (vi) calculate dependencies between variables, and/or (vii) become more knowledgeable or smarter based on human interaction. Such human interactions may include requesting that an operator confirm correlation between variables and relevance, thereby enabling the advisory system to learn which variables are related to one and relevant time so as to reduce human interaction thereafter, and provide appropriate and notifications and guidance in response to identifying the same or similar conditions that lead to the interaction.

One embodiment of an advisory system for operating a vessel may include at least one system configured to operate the vessel. Multiple sensors may be configured to sense variables of the system(s), where the variables may be representative of functional parameters of the at least one system. A processing unit may be in communication with the system(s) and sensors, and be configured to identify a change in values of a first variable over a time period. In response to determining the change in values of the first variable, the first variable may be correlated with a second variable that has a change in values over at least a portion of the time period. A notification inclusive of the first and second variables and change in values thereof may be generated for an operator to indicate whether the first and second variables are to be correlated with one another. In response to receiving an indication from the operator that the first and second variables are to be correlated with one another, an indicator indicative of the first and second variables being correlated with one another may be stored. Otherwise, an indicator of the first and second variable not being correlated with one another may be stored. Thereafter, in response to identifying a change in values of the first and second variables, a determination as to whether an indicator exists that is indicative with the first and second variable being correlated with one another may be made, and if so, a notice for the operator of the changing values of the first and second variables may be generated. Otherwise, a notice for the operator of the change in values of the first and second variables may not be generated.

One embodiment of a process of operating a vessel may include sensing variables of a system, where the variables may be representative of functional parameters of the system. A change in values of a first variable over a time period may be identified. In response to determining the change in values of the first variable, the first variable may be correlated with a second variable that has a change in value(s) over at least a portion of the time period. A notification inclusive of the first and second variables and change in value(s) thereof may be generated for an operator to indicate whether the first and second variables are to be correlated with one another. In response to receiving an indication from the operator that the first and second variables are to be correlated with one another, an indicator indicative of the first and second variables being correlated with one another may be stored. Otherwise, an indicator of the first and second variables not being correlated with one another may be stored. Thereafter, in response to identifying a change in value(s) of the first and second variables, a determination as to whether an indicator exists that is indicative with the first and second variable being correlated with one another may be made, and if so, a notice for the operator of the changing values of the first and second variables may be generated. Otherwise, a notice for the operator of the change in values of the first and second variables may not be generated. As a result, false positives and false negative notifications of status of the vessel system to an operator may be reduced.

An embodiment of a process of operating a vessel may include identifying a first trending change of sampled values over a first time period of a variable, where the variable may be representative of a functional parameter of the vessel. In response to determining the first trending change of sampled values of the variable, a notification inclusive of an indication of the first trending change of sampled values of the variable may be generated. The notification inclusive of the indication of the first trending change of sampled values of the variable may be communicated to an operator. The communication may be performed in any manner, such as displaying on a user interface of an operator console, as previously described herein. In response to receiving an indication from the operator as to whether the first trending change of sampled values of the variable is normal, a first indicator indicative of the first trending change of sampled values of the variable being normal may be stored for future use. Otherwise, in response to receiving an indication from the operator that the first trending change of sampled values of the variable is not normal, a second indicator indicative of the first trending change of sampled values of the variable not being normal may be stored for future use.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
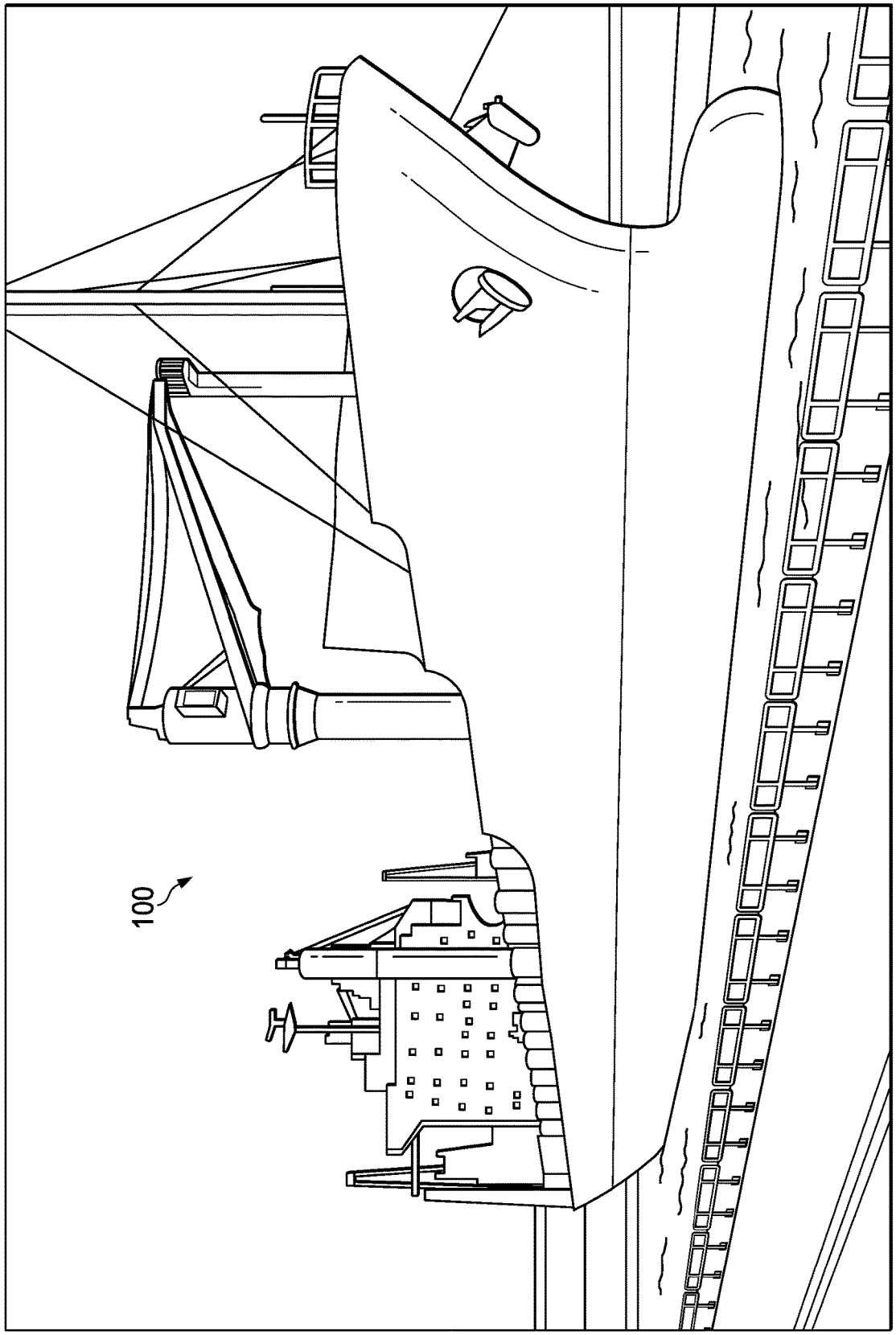
FIG. 1 is an image of a marine vessel that includes a vessel system that is used to control and operate the marine vessel.

Marine vessels, such as marine vessel 100 shown in FIG. 1, are used for shipping goods, people, and equipment around the world. Marine vessels operate in many different environmental conditions, including weather, temperature, and water temperatures. The environment may have an impact on the operation of the vessels, and systems and components that are used to operate and control the vessels. The marine vessels have vessel systems formed of electrical, mechanical, electromechanical, hydraulic, pneumatic, and other systems and components that are used to operate and control the vessels.

Figure 2:
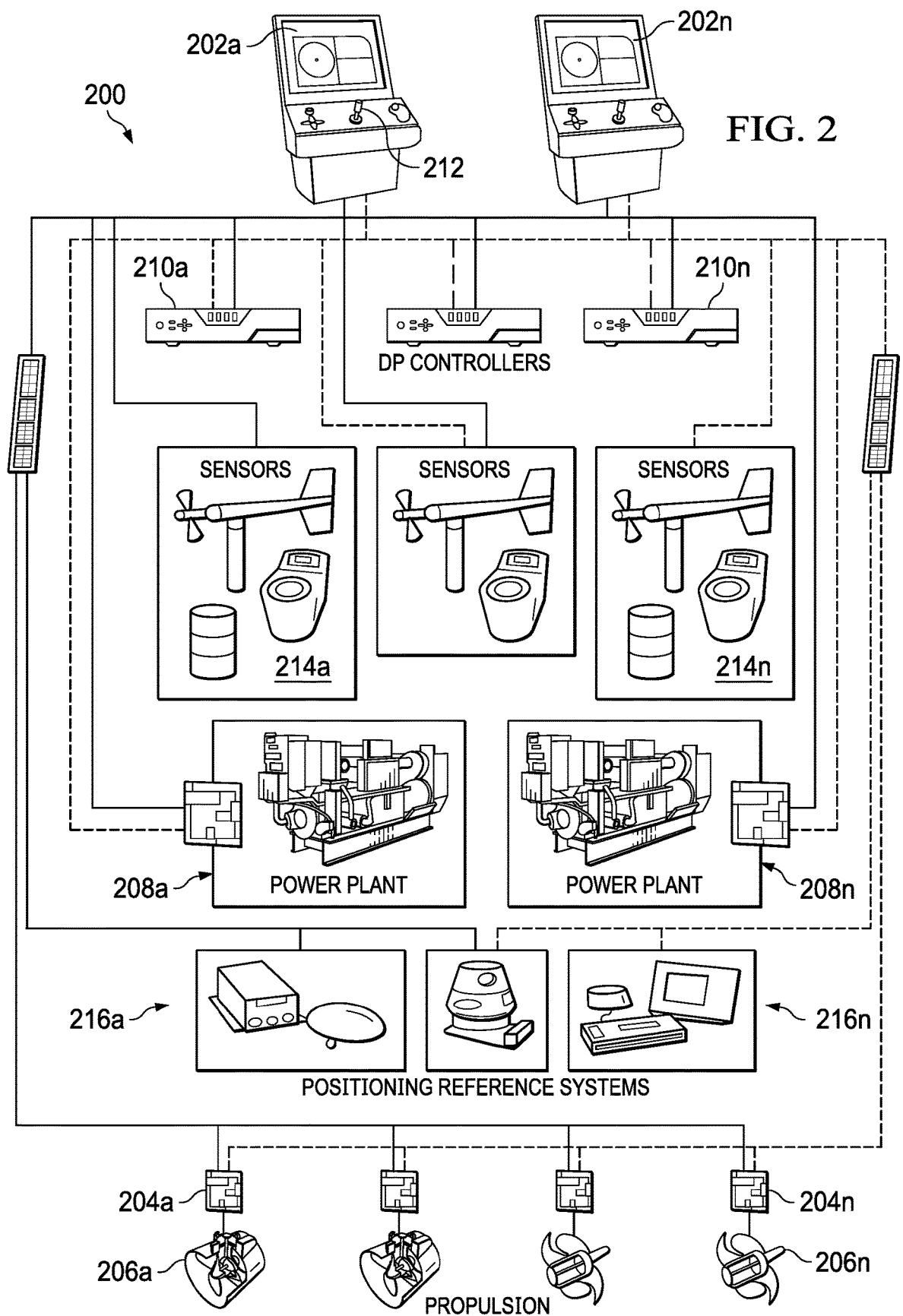
FIG. 2 is a schematic of an illustrative vessel system.

An illustrative vessel system 200 is shown in FIG. 2. In managing a vessel in which the vessel system is employed, an operator may interface with the vessel system 200 via user interfaces 202*a*-202*n*, such as those shown in more detail in FIG. 3, that are typically located on a bridge or control center of a vessel. The vessel system 200 is shown to include a variety of subsystems and components, including propulsion that include propulsion drivers 204*a*-204*n* (collectively 204) and thrusters 206*a*-206*n* (collectively 206). The thrusters 206 may include (i) conventional propellers that may be driven by power plants (e.g., diesel engines) 208*a*-208*n* (collectively 208) and (ii) electrically-controlled thrusters (e.g., tunnel thrusters) that are driven by electrical equipment that may convert energy from a main shaft extending from the power plant 208 that are driving the propulsion 206.

The vessel system 200 may further include dynamic positioning controllers 210*a*-210*n* (collectively 210) that may be configured to semi-automatically or automatically operate the power plants 208. The dynamic positioning controllers 210 may be used to control direction of the vessel by applying a certain amount of power to control thrust of each of the power plants and/or propulsion 206. The dynamic positioning controllers 210 may also be configured to control angle of one or more rudder(s) (not shown) of the vessel to further help maneuver the vessel, as desired by the operator interfacing with the user interfaces 202. For example, the operator may adjust position of a joystick 212 (e.g., forward-left, forward-right, back-left, back-right) to cause any of speed and direction of the power plants 208, propulsion 206, and/or rudder(s) to be adjusted to cause the vessel to follow a command by the operator. Alternatively, the user interface 200 may be programmed to automatically drive the vessel to a particular coordinate, such as a global positioning system (GPS) coordinate.

The vessel system 200 may further include sensors 214*a*-214*n* (collectively 214). The sensors 214 may be environmental sensors configured to sense environmental parameters (e.g., wind, current, temperature, atmospheric pressure, and so on) and operational sensors to sense operational parameters (e.g., voltage, current, vibration, direction, equipment and/or fluid temperature, fluid pressure, rotational velocity, and so on). By monitoring the various environmental and operational parameters, the vessel system 200, which may include an advisory system that may be configured to self-monitor and self-diagnose subsystems and components of the marine vessel and vessel system 200 to provide the operator with information to help prevent a catastrophic failure of the marine vessel, as further described herein. Position reference systems 216a-216n used for measuring position of the marine vessel are in communication with the user interfaces 202a-202n.

Figure 3:
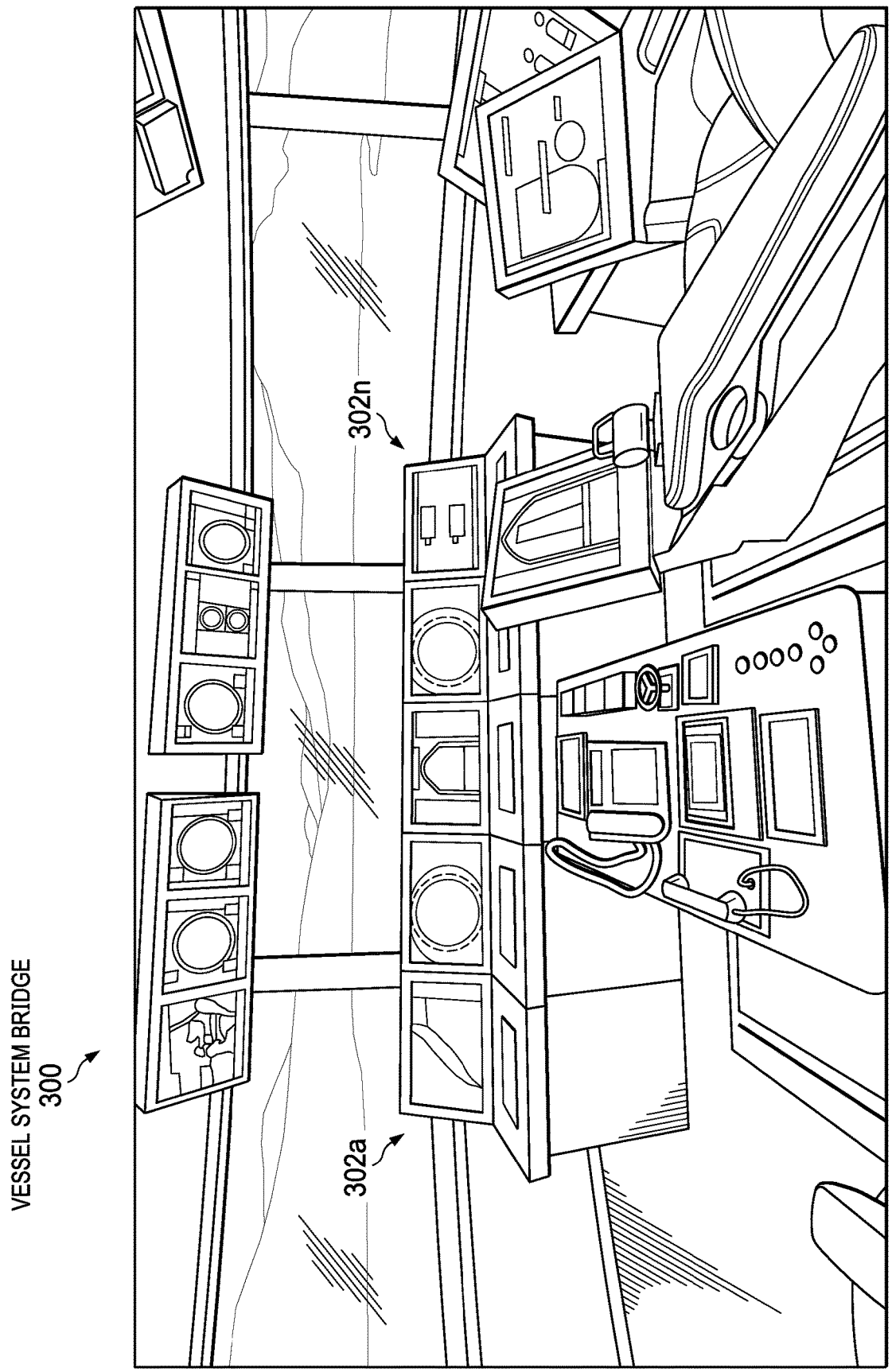
FIG. 3 is an illustrative of an illustrative user interface positioned on a bridge of a marine vessel via which a vessel system may be interfaced.

With regard to FIG. 3, an illustration of an illustrative bridge 300 of a vessel system that includes user interfaces 302a-302n (collectively 302) is shown. One or more of the user interfaces 302 may be used to display notifications that are generated by an advisory system that is executed by a computing system within the bridge 300 or elsewhere. The visual notifications may be in the form of text, graphics, pop-up window, or other graphical user interface element that may draw the attention of an operator of the user interfaces 302. In an embodiment, an audible notification may also be generated in conjunction with the visual notification. In addition to causing a visual and/or audible notification to be generated and presented on one or more of the user interfaces 302, a notification (e.g., text message, email, instant message, or otherwise) may be communicated to a mobile electronic device (e.g., mobile telephone, handheld controller with a user interface, etc.) to notify an operator in case the operator is not currently located on the bridge 300.

General Architecture

A monitoring or advisory system is a hardware/software system that is configured to monitor subsystems of a marine vessel (or other vehicle, such as an airplane), determine and/or identify problems or potential problems of subsystems and components, and attempt to correlate variables that may be indicative of the problems or potential problems of the subsystems and components. The advisory system may be used to create notifications with warnings, alarms, predictions, and optimizations for a vessel system of a vessel. In accordance with the principles described herein, a reliable and trustworthy relationship may be created between a human operator or user and the advisory system. If the advisory system cannot compute reliable reports to the user, the advisory system will lose its integrity and value for an operator of the vessel. One feature that provides success for an advisory system as provided herein is the capability to learn from the user, which makes the advisory system more educated over time, thereby being able to advise an operator when relevance of significance are determined and ignoring situations that are considered irrelevant or not significant enough (e.g., false positives and false negatives) to be concerned by the operator.

Figure 4:
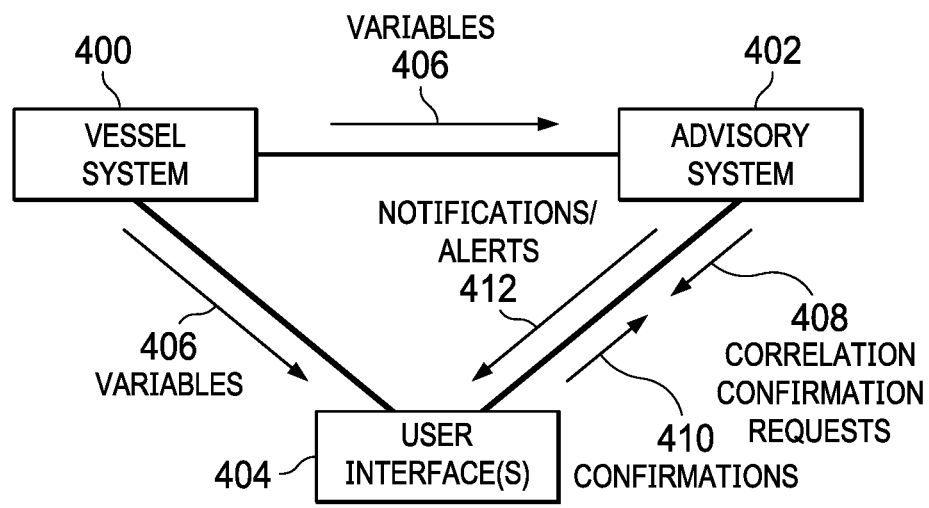
FIG. 4 is a block diagram of an illustrative vessel system in communication with an advisory system that is used to monitor variables of the vessel system and provide notifications and alerts to an operator via a user interface.

With regard to FIG. 4, a block diagram of an illustrative vessel system 400 in communication with an advisory system 402 that is used to monitor variables of the vessel system and provide notifications and alerts to an operator via a user interface 404 is shown. The vessel system 400 may collect and communicate variables 406 collected by sensors that are configured to collect operational data from systems and subsystems (see FIG. 2, for example) that form the vessel system 400. The variables 406 (i.e., values collected from sensors or derived from values collected from the sensors) of the vessel system 400 are communicated to user interface(s) 404 for display thereon (see, for example, FIG. 3) along with an advisory system 402 that may process the variables 406 to monitor the variables 406 and to determine possible correlations.

In an embodiment, the variables 406 may include either or both of environmental parameters and operational parameters of the marine vessel as sensed by the vessel system 400, and the advisory system 402 may utilize the variables 406 in determining whether or not a problem has or may be developing along with potential underlying cause(s) of the problem. For example, if speed of the vessel is not matching a speed at which the operator has commanded, the advisory system 402 may correlate that a fuel pump sensor may sense that a fuel pump is not pumping an amount of fuel anticipated, a wind sensor may sense that the heading wind speed is gusting higher than anticipated by a controller, a current sensor may sense that water current speed is higher than anticipated by the controller, an electric current sensor may sense that an amount or a combination of the parameters may correlated with one another The advisory system 402 may include a processing unit formed of one or more processors, memory, input/output (I/O) unit configured to communicate over a local area network (e.g., with a computer of the vessel system) or wideband area network (e.g., satellite network, Internet, etc.). In an embodiment, the advisory system 402 may communicate correlation confirmation request(s) 408 to the user interface(s) for a human operator to provide feedback or confirmations 410 as to whether the identified correlations of the parameters or variables 406 in the correlation confirmation request(s) 408 are related and/or relevant. That is, if the advisory system 402 is not confident that two or more variables 406 are correlated with one another and a notification or alert 412 is determined due to a failure or potential failure, then the advisory system 402 may communicate one or more correlation confirmation requests 408 to the user interface(s) 404 so that an operator may assist the advisory system 402 that is a machine learning system to learn which variables are relevant and/or related to one another. Over time, the advisory system 402 may learn so as to reduce or substantially eliminate the need to send correlation confirmation requests 408 to the operator. The user interface(s) may be the same or different from the user interface(s) used for directly interacting with the vessel system. For example, the user interface(s) with which the advisory system may interact may be mobile devices, webpages, emails, SMS messages, or any other user interface that enables the user to provide feedback to the advisory system.

Figure 5A:
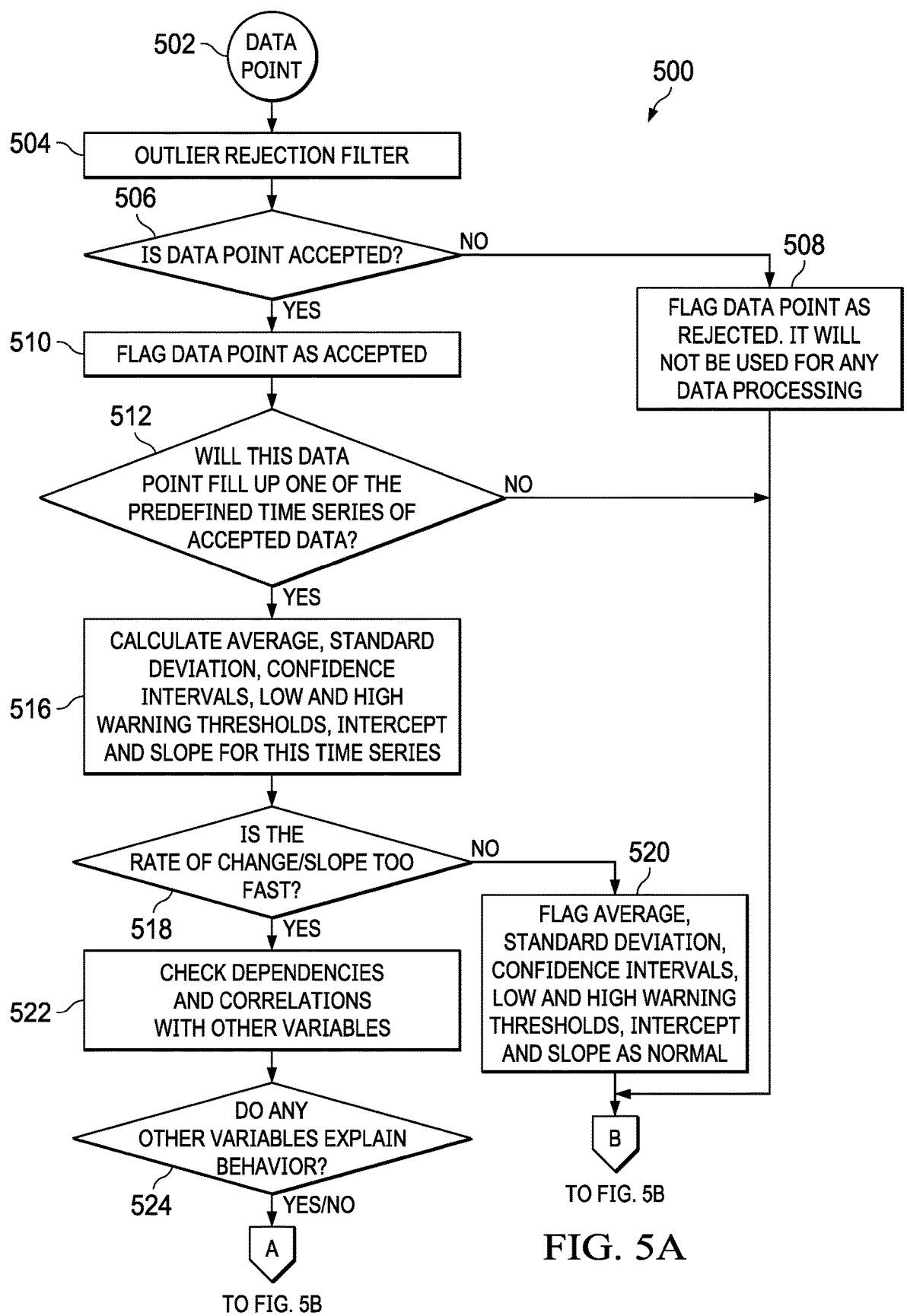
FIG. 5 is a high-level flow diagram of an illustrative advisory system process that includes components and processes that interacts with a user to learn whether correlated variables of a vessel system are dependent and/or relevant.
Figure 5B:
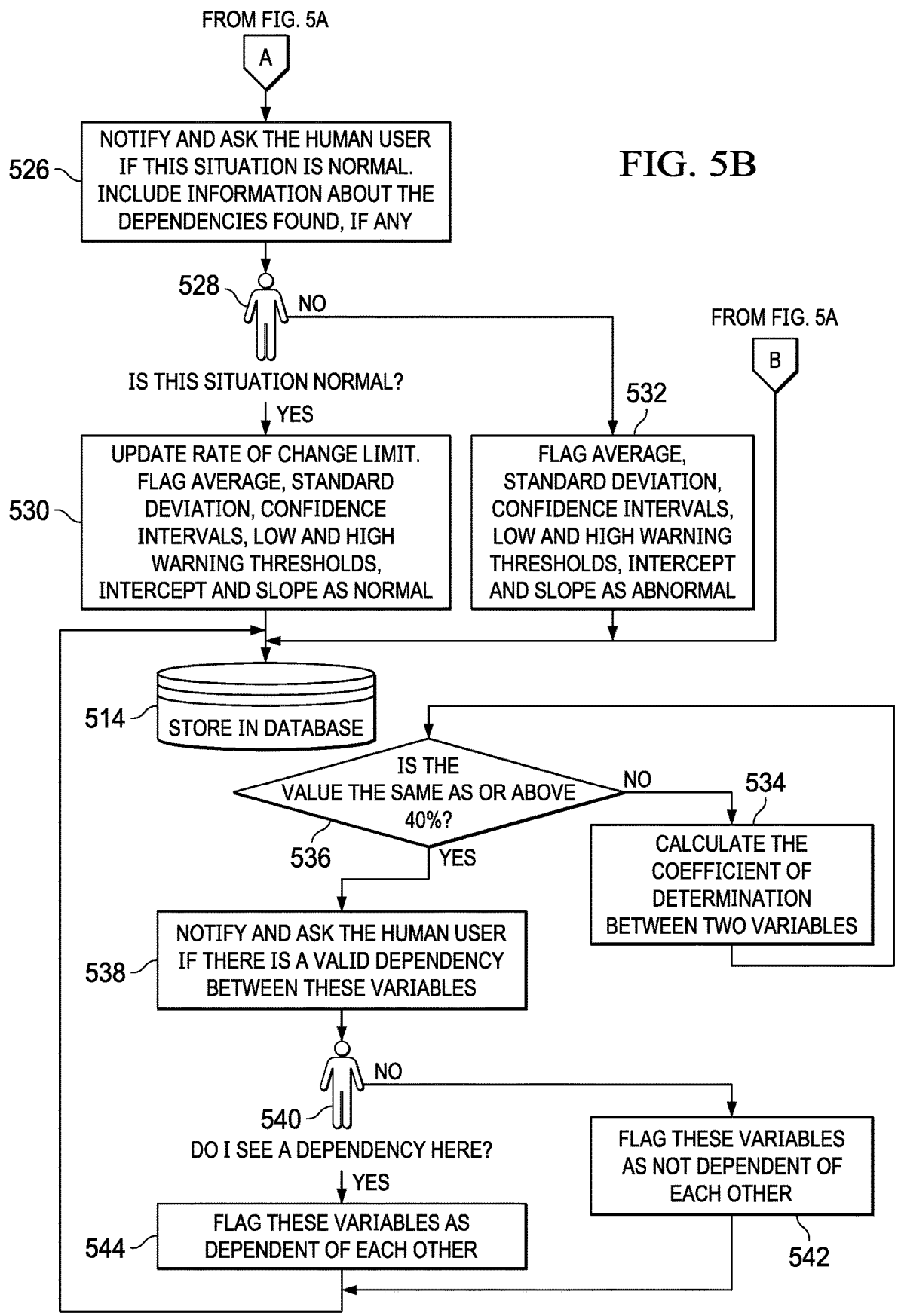

With regard to FIG. 5, a high-level schematic of an illustrative advisory process 500 may be executed on an advisory system is shown. The process 500 may be configured to receive a data point 502 from a sensor, such as an environment sensor or operational sensor, and provide the data point 502 to an outlier rejection filter 504 for processing thereby. The outlier rejection filter 504 may be configured to determine whether the data point 502 is outside of a typical range of a parameter or variable of which the data point 502 is defined. At step 506, a determination as to whether the data point 502 is to be accepted may be made. If not, then at step 508, the data point 502 may be flagged as being rejected such that the data point 502 is not used for any data processing. In an embodiment, a determination may be made whether repeated unacceptable data points are determine to notify an operator of a potential problem with a sensor exists. If a determination is made at step 506 that the data point is to be accepted as a result of not being filtered by the outlier rejection filter 504, then the process 500 may continue at step 510, where the data point 502 may be flagged as being accepted. It should be understood that the data point 502 may simply be accepted or not accepted without actually creating and assigning a flag to the data point 502.

The process may continue at step 512, where a determination may be made as to whether the data point 502 is to fill up one of a predefined time series of accepted data. If not, then the process may continue to step 514, where the data point 502 may be stored in a database. Otherwise, at step 516, the data point 502 may be used to calculate average, standard deviation, confidence intervals, low and high warning thresholds, intercept and slope for a time series, and so forth. The database may be configured to store variable data and correlation data. At step 518, a determination as to whether the rate of change and/or slope is too fast may be made. If not, then at step 520, the average, standard deviation, confidence intervals, low and high thresholds, intercept and slope may be flagged as normal. Otherwise, as step 522, dependencies and correlations with other variables may be checked or determined.

At step 524, a determination may be made as to whether any other variables explain behavior described by the statistics calculated at step 516. In either case, the advisory system may notify and ask the operator whether the behavior described by the statistics are normal or typical, and whether any dependencies between the variables can be used to describe the behavior. As previous described, the behavior (e.g., temperature of diesel engine trending upwards) may be identified prior to occurring using correlated variables or parameters that are measured by sensors. The operator may be able to provide a response to the inquiry as to whether the behavior is normal and/or whether one or more variables correlate to the behavior. In general, a variable is to be correlated if the variable is outside of typical levels or specifications. In an embodiment, if a value of one or more variables or parameters is above or below a maximum or minimum specification, then the variable(s) may be considered for correlation, and if potentially related to the variable potentially causing the behavior, the variable(s) may be provided to the operator, such as operator 528, for confirmation.

The operator 528 may be provided with two options in responding to the question as to whether the behavior is normal and/or whether one or more variables correlate to the behavior. If so, then the process 500 may continue to step 530, where rate of change limit may be updated. An average, standard deviation, confidence intervals, low and high warning thresholds, intercept, and slope may be flagged as normal, and stored in the database at step 514. Alternatively, at step 532, the average, standard deviation, confidence intervals, low and high warning thresholds, intercepts and slope may be flagged as abnormal, and stored in the database at step 514.

In another aspect of the process 500, a coefficient of determination between two variables may be calculated at step 534. At step 536, a determination as to whether a value of the coefficient of determination between the two variables is above a certain percentage, such as 40%. It should be understood that other threshold percentages may be utilized. If not, the process returns to step 534. If so, then at step 538, a notification and query may be made to an operator 540 if the there is a valid dependency between the two variables determined to be correlated. The operator 540 may be the same as operator 528. The operator 540 may be provided with two options that enables the operator 540 to make one of two decisions, including that (i) the variables are not dependent on one another at step 542, and (ii) the variables are dependent on one another at step 544. The decision as to whether the variables are confirmed to be correlated may be stored in the database at step 514.

In general, the process 500 may provide for communicating with operator(s) to verify dependencies or correlations along with relevancies of variables relative to behaviors of the vessel system or components thereof. The advisory system process 500 may be executed by a computing system on a vessel that is part of a vessel system, on a separate system (e.g., server or other computing system) on the vessel, or remotely located from the vessel, such as on the cloud or within a facility of a vessel operator or third party, such as developer of the advisory system. It should be understood that the advisory system process 500 is illustrative and that a wide variety of alternative configurations and processes may be utilized.

False warnings and alarms are reduced or eliminated utilizing the advisory system provided herein. By using the outlier rejection filter 504, spikes in the collected data on a vessel may effectively be removed. In the removal of spikes in the collected data, not only are false notifications reduced or removed, but also data collection may be improved for calculating nominal values.

Nominal values contain an expected value for a monitored variable with upper and lower warning levels. An example of such a monitored variable is voltage of a 12-volt battery, where the voltage may vary between 11 and 13 volts. As understood in the art, a range between 11 and 13 volts may be dependent on a state of operation. The same battery may also have absolute upper and lower alarm limits, which are typically set by a manufacturer of the battery. In this case, the lower and upper alarm limits could be 10 and 14 volts, respectively.

The nominal values may be calculated and based on the collected data, which is assumed to be operating under normal conditions for a defined period. The assumption of operating under normal conditions is a reasonable one, as initial data collection may be performed soon after a supplier and regulatory body has approved equipment and vessel for operation. In an embodiment, a minimum of one hour may be used to collect data for determining initial nominal values to be computed. Other durations of time may be used to collect data to establish nominal values that are used for different systems and subsystems of the vessel system.

A reasonable question could be: how can it be known that the monitored variable will be nominal in the hours, days, and weeks to come after an initial time period (e.g., one hour) of data collection? The answer to this question lies in the use of machine learning by interacting with the human operator(s) 528 and 540.

In an embodiment, the utilization of regression methods to predict the future of variables, the advisory system can predict when a variable will hit upper and lower warning and alarm thresholds. When the advisory system detects such a threshold crossing, the advisory system may first check if there are any correlation with any other variables, such as geolocation, sea temperature, and others. It should be understood that there may be hundreds or thousands of variable correlation determinations that may be made from a vessel system and environment in which the vessel is operating. The advisory system may then notify the human operator or user for a confirmation on the behavior of the variable. The human decision may be fed back to the advisory system, so that the advisory system may adjust actions the next time the same or similar situation arises.

By enabling human interaction, the advisory system may learn and remember how a human would handle a certain situation (e.g., whether a particular correlation between sensed signals is relevant), leading to a smarter monitoring and advisory system that can create confident and reliable notifications and reports to the operator. Over time, the advisory system may suggest optimizations to the customer for a more cost-effective and less time-consuming operation of the vessels.

The advisory system may utilize modern advances in global navigation satellite system (GNSS) receivers and global positioning system (GPS) receivers, including precision, reliability and quality calculations, based on a guidance documentation from the International Marine Contractors Association (IMCA) and International Association of Oil and Gas Produces (OGP). The use of advanced positioning receivers allow for the advisory system to utilize the accuracy to correlate positioning with certain other variables or parameters, as further described herein.

For example, the advisory system may utilize some or all available data in modern GNSS receivers and correlate the data with solar interference, configuration of GNSS receivers, changes in constellations based on geolocation and time and date, and other external interferences to provide proactive measures and ensure safe operations fleet wide (in the case of the vessel being part of a fleet of vessels). For instance, while a vessel moves closer to an oil rig, the advisory system may continuously monitor precision, reliability, and quality data. Blockage of correction satellites, multipath issues, or any other negative trending of the quality measurements may be detected. If the advisory system has seen one of the scenarios above before, the advisory system may predict if such a scenario is going to happen again. The advisory system may thereby proactively notify and advice other vessels approaching the same oil rig if the advisory system detects a similar scenario.

Detailed Functionality

Each collected data variable may be processed by the outlier rejection filter 504 to remove spikes and outliers to ensure a better foundation for the calculation of nominal values. Spikes and outliers negatively affect the nominal values, in addition to causing false warnings and alarms, if not removed.

One outlier filter 504 based upon the median absolute deviation may provide a safe and established way of removing spikes in a dataset that is symmetric and normally distributed.

An outlier value may be calculated in the following way:

$$O(x_i, X) = \frac{|x_i - \mathrm{median}(X)|}{1.4826 \cdot \mathrm{mad}(X)}$$

Where $x_i$ is a current data measurement, X is an array containing the last N measurements, median( . . . ) is a function returning the median of the inserted array, 1.4826 is a value that yields normally distributed data, and mad (X) is defined as:

$$\mathrm{mad}(X) = \mathrm{median}(|X - \mathrm{median}(X)|)$$

For a genuine data set, assumed to be drawn from a symmetric distribution, all samples may be rejected for which:

$$O(x_i, X) > 3.5$$

The resulting data set, after being processed by the outlier rejection filter, may contain data points that are better suited for calculating statistical values, including nominal values for the quantities being monitored. The specific values are illustrative and may be different, including being dynamic, to support the outlier rejection filter, as understood in the art.

Nominal Values and Thresholds

Figure 6:
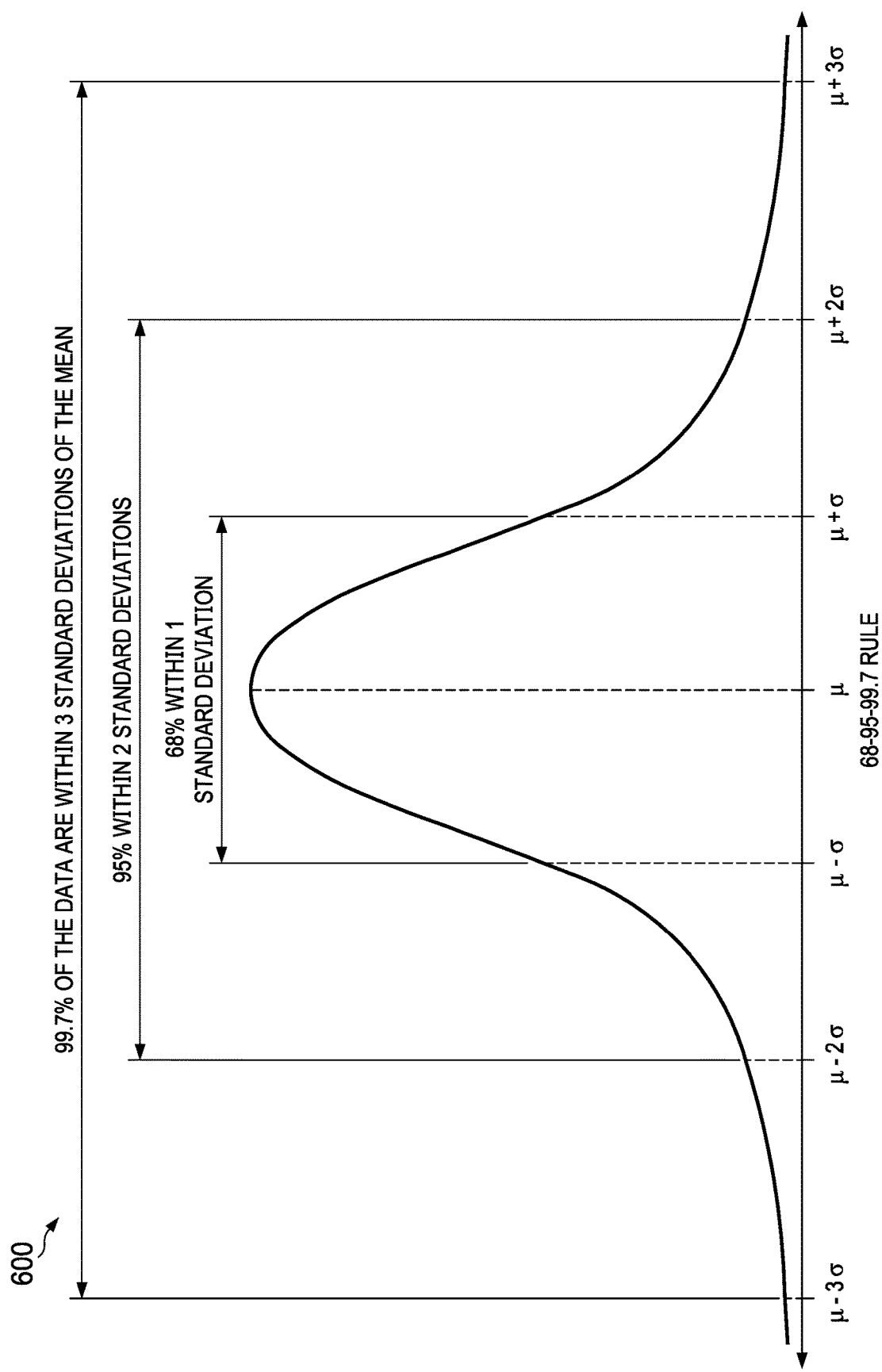
FIG. 6 is an illustrative standard deviation curve that may be used by an advisory system to help monitor changes of a parameter or combination of parameters of a vessel system for operating a vessel.

After the measurement has been filtered by the outlier rejection filter 504, the measurement may either be accepted or rejected at step 506. If accepted, the measurement may be used to calculate a new set of nominal values at step 516, where the nominal values may include upper and lower warning thresholds. FIG. 6 is an illustrative standard deviation curve 600 that may be used by an advisory system to help monitor changes of a parameter or combination of parameters of a vessel system for operating a vessel. It should be understood that alternative statistical analyses curves and/or protocols may be utilized by the advisory system to assist with monitoring changes of a parameter or combination of parameters of a vessel system.

In an embodiment, a nominal value may be set by an average calculated from collected data over defined time intervals, such as 10 minutes, 1 hour, 1 day, 1 week, 1 month, quarterly, and/or yearly. In an embodiment, the longer time intervals are given weight over the shorter time intervals, as confidence intervals may become narrower due to a higher number of samples, which provides a more accurate average ($x_{avg}$) and standard deviation ($x_{std}$). N is a number of data points in the dataset for a specific time interval, as understood in the art.

$$x_{avg} = \frac{1}{N} \sum_{i=1}^{N} x_i$$

$$x_{std} = \sqrt{\sum_{i=1}^{N} (x_i - x_{avg})^2}$$

The standard deviation for the variable may be utilized to calculate upper and lower warning thresholds. In statistics, for a normal distributed data set, there is a rule called the 68-95-99.7 rule that correlates to 1-sigma, 2-sigma, and 3-sigma standard deviations that is used to remember the percentage of values that lie within a band around the average values, as shown in FIG. 6.

As an example, given a sample rate of 1 Hz (i.e., one sample per second), and using 3 standard deviations to calculate the lower and upper warning thresholds, 99.7% of all samples lie within the band. After one day, 86,400 samples are collected, where 2,592 samples are outside the band, which would equal a warning on average every 3 seconds, which is way too often for operation of a vessel.

Using 4.5 or 5 standard deviations instead provides a warning on average every 2 or 20 days, respectively, which is a much more practical time interval to receive warnings for a vessel system of a vessel being sampled every second.

The upper and lower warning thresholds may be calculated with the following equations:

Upper Warning Threshold=$x_{avg} + k \cdot x_{std}$

Lower Warning Threshold=$x_{avg} - k \cdot x_{std}$, where the chosen multiplier k may be adjustable for an operator to either make the warning thresholds tighter or wider. In an embodiment, A k=5 may be set as default for all variables. In an embodiment, k may be set so that the thresholds are within the upper and lower alarm thresholds, which may be set by a manufacturer of a system or subsystem of a vessel system that provides variable(s) being monitored.

The upper and lower thresholds for the confidence interval with 95% confidence may be calculated with the following equations:

$$\text{Upper Confidence Threshold} = x_{avg} + 1.96 \cdot \frac{x_{std}}{\sqrt{N}}$$

$$\text{Lower Confidence Threshold} = x_{avg} - 1.96 \cdot \frac{x_{std}}{\sqrt{N}}$$

Predictions

A prediction of where a variable will be in the future may be used in the advisory system as predictions allow for knowing when the variable might hit upper or lower warning and alarm thresholds. Such a prediction system used by the advisory system allows for proactively notifying an operator of a vessel as to when the vessel system being monitored might have a problem.

There are many methods to predict the future, including linear and nonlinear regression methods, but for simplicity purposes, the advisory system provided herein may initially focus on a linear alternative, which is based on fitting an available dataset to the following linear equation:

$$x_i = \alpha + \beta \cdot t_i,$$

where $t_i$ is the time for the current sample i, $\alpha$ is the intercept, and $\beta$ is the rate of change for the variable $x_i$. $\beta$ and $\alpha$ may be calculated with the following equations:

$$\beta = \frac{\sum_{i=1}^{N}(t_i - t_{avg})(x_i - x_{avg})}{\sum_{i=1}^{N}(t_i - t_{avg})^2}$$

$$\alpha = x_{avg} - \beta \cdot t_{avg},$$

where $x_{avg}$ is the average of all measurements in the available dataset, and $t_{avg}$ is the average of all the time samples in the available dataset.

The linear equation may be used to calculate when the variable being used for prediction will potentially collide with the different thresholds (e.g., notification and alert threshold(s)). Even though most systems and subsystems are non-linear by nature, the systems may be linearized by modeling over a small enough time interval. The different thresholds may be set based on manufacture specified thresholds, recommended thresholds, or otherwise. The advisory system may include more advanced regression methods, and may also include mathematical models, where available, including non-linear mathematical models. In an alternative embodiment, a mathematical model of the variable(s) may be used, and predictions of when the variable(s) may cross a threshold may be made by executing the mathematical model.

The rate of change or slope of a variable may also be monitored with high and low thresholds since the normal behavior of the variable may have an upper and lower limit on how fast the variable can change. To determine the upper and lower thresholds, knowledge about the variable or parameter may be utilized, either from a manufacturer or otherwise (e.g., testing, setting variances based on system or component specifications, actual operational performance, historical performance, etc.). The limits may be set and/or modified by a user or operator of the vessel. Additionally and/or alternatively, the limits may be set by a developer of the advisory system. The limits may be set by limits of manufacturers of systems, subsystems, and/or components (e.g., mechanical structures, electrical components, etc.).

The advisory system may utilize machine learning to assist with establishing various upper and lower limits. The advisory system may execute a continuous correlation analysis with other variables, up to and including all other variables of the vessel system or external to the vessel system, such as geolocation, sea temperature, time and date, etc., to understand the dependencies between or amongst variables of the vessel system.

For instance, if the advisory system detects that a temperature change of a generator is changing too fast, the advisory system may first check if there are any strong correlations with other variables before sending a notification to an operator. In this generator temperature change notification, the advisory system may ask the human operator or user if the behavior (e.g., temperature change of the generator optionally correlated to another variable) is normal or not. If the behavior is indicated as being normal by the human operator, then the advisory system may be configured not to communicate with the user with a notification the next time. On the contrary, the advisory system may send out a warning or alarm notification the next time the same situation arises. In an embodiment, the advisory system may be configured to enable the operator to dismiss the notification a first time, but enable the advisory system to alert the operator in the future if the same situation arises, thereby allowing for the user to learn of possible correlations that may exist and that may previously have been unknown to the operator.

Correlations and Dependencies

The advisory system may continuously be configured to identify new dependencies between variables. Each time the advisory system identifies a potential correlation between two or more variables, the advisory system may notify the human operator for a confirmation as to whether or not there is a real dependency between or among the variables identified with potential correlation. The advisory system may thereafter remember (i.e., store) a decision of the operator for future analyses.

As an example, two variables, x and y, may be tracked. Based on the collected datasets or variables, $X = \{x_1, x_2, \ldots, x_N\}$ and $Y = \{y_1, y_2, \ldots, y_N\}$, the coefficient of determination, or $R^2$, may be calculated using the following equation (assuming a linear model for the relationship between the variables):

$$R^2 = \frac{(\overline{xy} - \overline{x}\,\overline{y})^2}{(\overline{x^2} - \overline{x}^2)(\overline{y^2} - \overline{y}^2)}$$

where, $$\overline{xy} = \frac{1}{N}\sum_{i=1}^{N} x_i y_i$$

$$\overline{x} = \frac{1}{N}\sum_{i=1}^{N} x_i$$

$$\overline{y} = \frac{1}{N}\sum_{i=1}^{N} y_i$$

$$\overline{x^2} = \frac{1}{N}\sum_{i=1}^{N} x_i^2$$

$$\overline{y^2} = \frac{1}{N}\sum_{i=1}^{N} y_i^2$$

The coefficient of determination, $R^2$, normally ranges between 0 and 1, where 0 indicates 0% correlation between the variables, while 1 indicates 100% correlation between the two variables. The advisory system may send a notification to the human user when a particular correlation limit or threshold (e.g., 40%) is crossed by the coefficient of determination to obtain a confirmation from the user as to whether a valid correlation between the variables of the vessel system exists or not. It has been found that 40% as a correlation limit supports an acceptable level of interactions with an operator, but a higher or lower correlation limit may be used. It should also be understood that the correlation limit may be varied for different variables, especially for ones that may have a catastrophic impact on the vessel (e.g., oil pump pressure, ballast pressure, engine temperature, etc.).

One reason why the advisory system cannot validate its own discovery, based upon the $R^2$ value, is due to a risk of confirming a false correlation. Since the coefficient of determination is based on a linear model, false correlations may occur due to the nature of some datasets. A human eye may quickly validate whether a true correlation or not exists between the two variables.

In response to the user validating whether are correlation or no correlation exists between the two variables at step 538, the advisory system may store the decision in the database at step 514 so as to remember the decision in the future so as to advise (e.g., notify or alert) or not advise the operator should the same or similar correlation between the two variables exist and qualify for a notification. Over time, the advisory system may ask the operator about new dependencies less frequently as the advisory system has previously mapped out most of the dependencies. The advisory system may map most dependencies based on a linear regression model, but the advisory system may utilize non-linear regression or other mathematical models to calculate $R^2$ values for remaining dependencies.

As part of the advisory system, correlations may monitor possible dependencies between internal variables of the vessel system on the vessel and the external variables, such as geolocation, sea temperature, air temperature, current, waves (e.g., wave size, wave frequency), time, season, wind, and humidity. These environmental, location, and time dependent variables are may be correlated with the internal vessel variables, thereby enabling impact of environmental parameters on operational parameters.

For instance, when a vessel is operating in the North Sea, temperatures of most internal vessel variables are expected to be lower compared to the vessel operating in warmer waters, such as the Gulf of Mexico. Similarly, knowing behavior of internal variables as a function of the time-of-year (season) or other environmental conditions might reveal optimizations not previously considered.

Presentation

Figure 7:
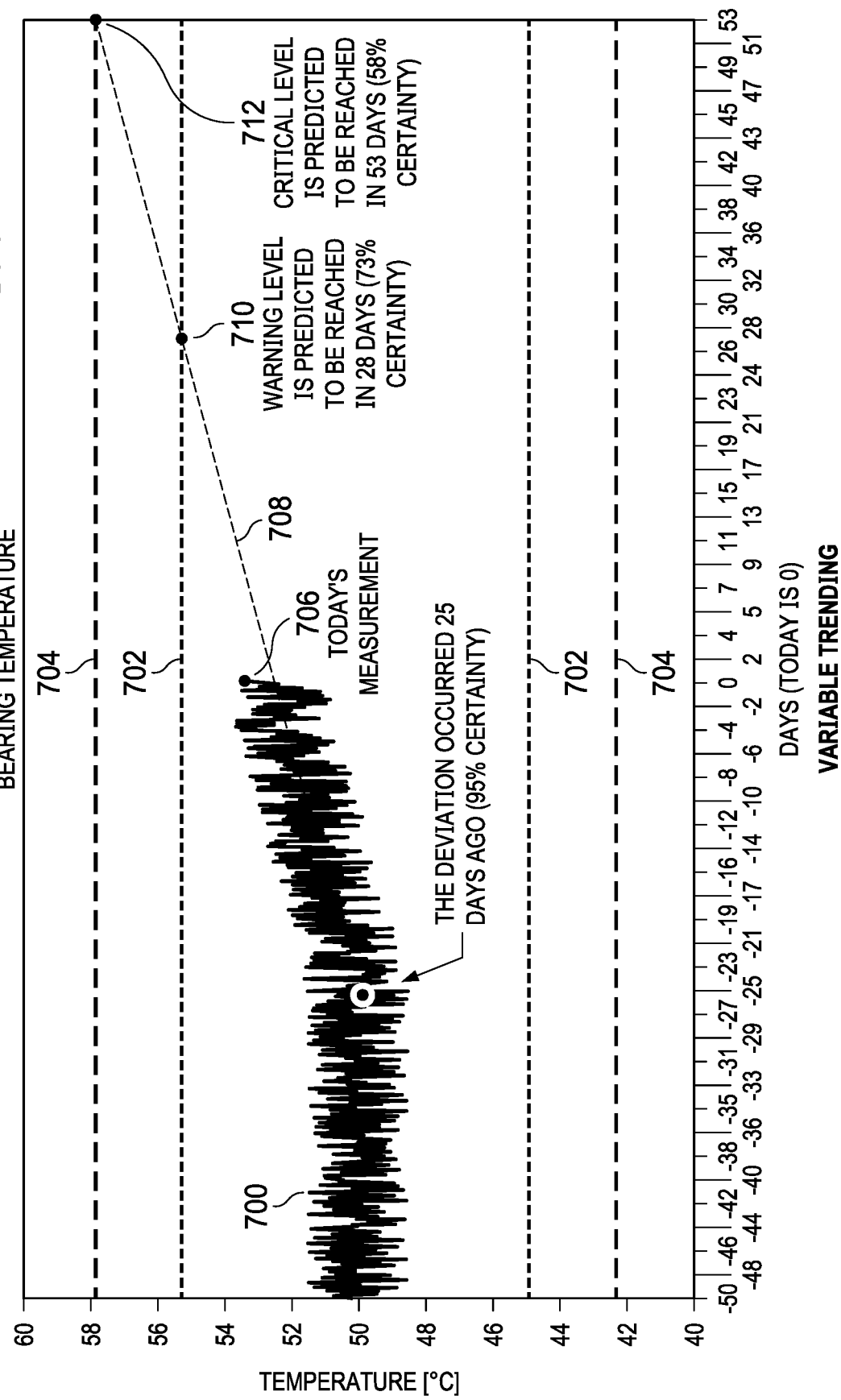
FIG. 7 is a graph showing an illustrative variable trending upwards in temperature over time along with established warning levels that may be used as indicators to an operator by an advisory system.

With regard to FIG. 7, a graph showing an illustrative variable curve 700 trending upwards in temperature over time along with established upper and lower warning levels 702 and alert levels 704 that may be used to generate and communicate indicators or messages to an operator by an advisory system is shown. The graph displays measurements of variables that are collected periodically (e.g., daily) or aperiodically (e.g., in response to an event) by the advisory system, and plots the measurements against both warning and critical levels 702 and 704 of the variable. In the case of a bearing temperature as shown in FIG. 7, for example, the temperature may be tracked to be trending upwards. The trending of the temperature may be correlated with other variables, so as to potentially determine a "cause and effect" relationship.

As further shown in FIG. 7, a current measurement or "Today's measurement" 706 that shows how the bearing temperature variable curve 700 is trending over time. A linear projection curve 708 shows that if the current trend of the curve 700 remains the same, then the warning level 702 is predicted to be reached in 28 days with a 73% certainty at point 710 and the critical level 704 is predicted to be reached in 53 days with a 58% certainty level at point 712. The prediction may be provided to the operator to enable the operator to try and prevent reaching either of the levels 702 or 704 by correcting (e.g., repairing) a subsystem, for example.

Figure 8:
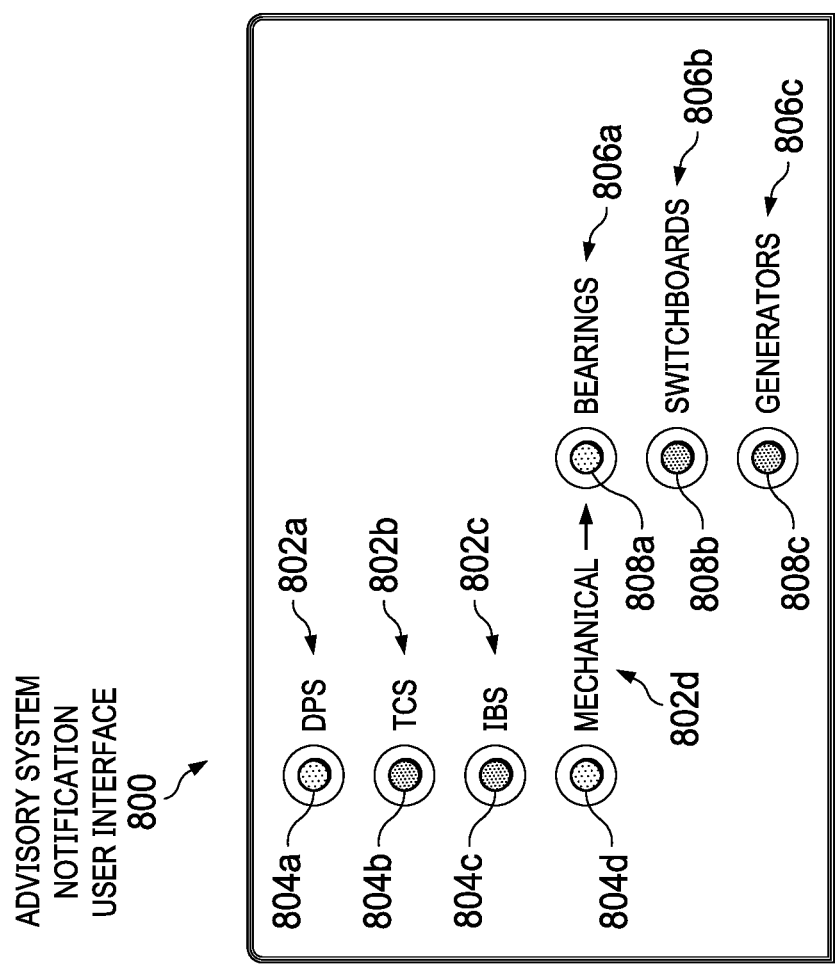
FIG. 8 is an illustration of an illustrative high-level layout of a user interface that may be used by an operator in operating a vessel system.

With regard to FIG. 8, a screenshot of an illustrative user interface 800 of an advisory system that shows or lists subsystems 802*a*-802*n* (collectively 802) that are part of a vessel system along with associated status indicators 804*a*-804*d* (collectively 804). Two subsystems, Thruster Control System (TCS) 802*b* and Integrated Bridge Systems (IBS) 802*c*, that are indicated as being nominal, and two subsystems, Dynamic Positioning System (DPS) 802*a* and Mechanical System (MES) 802*d*, that are indicated as having imminent actions due or coming due by displaying indicators 804*a* and 804*d* in a different format and/or color (e.g., red) than indicators 804*b* and 804*c* associated with the subsystems 802*b* and 802*c* (e.g., green) that were determined to be operationally nominal. It should be understood that alternative formats and/or colors may be utilized to indicate that a subsystem, component, and/or variable reaching or reached a warning level as compared to a subsystem, component, and/or variable reaching or reached a critical level. The mechanical subsystem 802*d* is shown to be expanded in a hierarchical format to show subsystems or components (bearings, switchboards, generators) 806*a*-806*c* of the mechanical system. An identifier 808*a* associated with the bearings 806*a* indicates that a problem of the mechanical subsystem 802*d* is with the bearings 806*b*. A user may select (e.g., click) on the bearings 806*a*, and further detail on a specific location of the bearings 806*a* may be shown with text and/or graphics that has breached the warning or/and alarm levels.

In an embodiment, a user interface, such as the user interface 800 shown in FIG. 8, that provides information to an operator may use colors for notifying and/or alerting users of issues that may be trending toward a problem or are actually a problem. A green (nominal) level may provide a health check, trending analysis, and other statistics on a system or subsystem in question. The advisory system does not act on a green level, since a green (nominal) level is considered normal system behavior or operating conditions. It should be understood that alternative configurations of the notification and user interface may be utilized to provide the same or similar functionality as provided herein.

In an embodiment, a yellow (warning) level may be used to inform the operator of a trending change that could portend a future breach of the warning and alarm levels. If the advisory system has not seen a trending change before, the advisory system may ask for a confirmation from the operator (e.g., per email, text, website, integrated system, dashboard on an onboard control system, advisory system user interface, etc.), whether the trend change is normal or not. The request to the operator enables the advisory system to remove false warnings and alarms in the future.

In an embodiment, the operator may be provided with the following information on a yellow level:
(i) Detected dependencies with other variables;
(ii) When the system was last used;
(iii) Trend of the data; and
(iv) How much time before a warning and alarm threshold will be breached.

In an embodiment, a red (alarm) level informs of an imminent or current failure along with details on the statistical and system rules. A no-go advisory may be issued to the operator in an alert level event. Presumably a yellow level advisory notification will precede a red level advisory notification, but in the event that a yellow level advisory notification does not occur due to an unforeseeable failure or is somehow missed by an operator, for example, the red advisory or alert may provide an alert message along with the ability for the operator to respond to correlation relevancy of multiple variables.

Figure 9A:
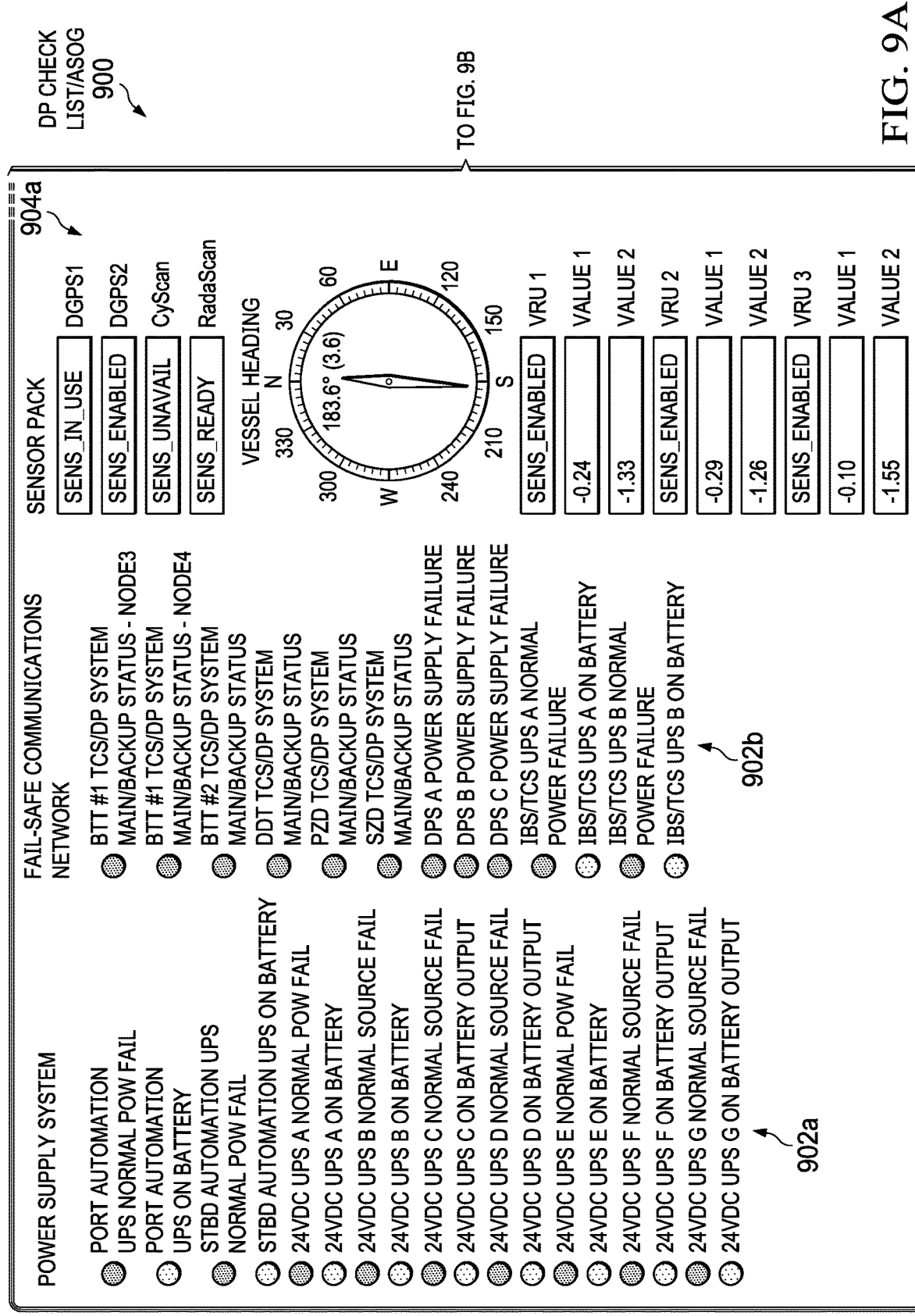
FIG. 9 is an illustration of an illustrative checklist or status indicator user interface of a vessel system for operating a vessel.
Figure 9B:
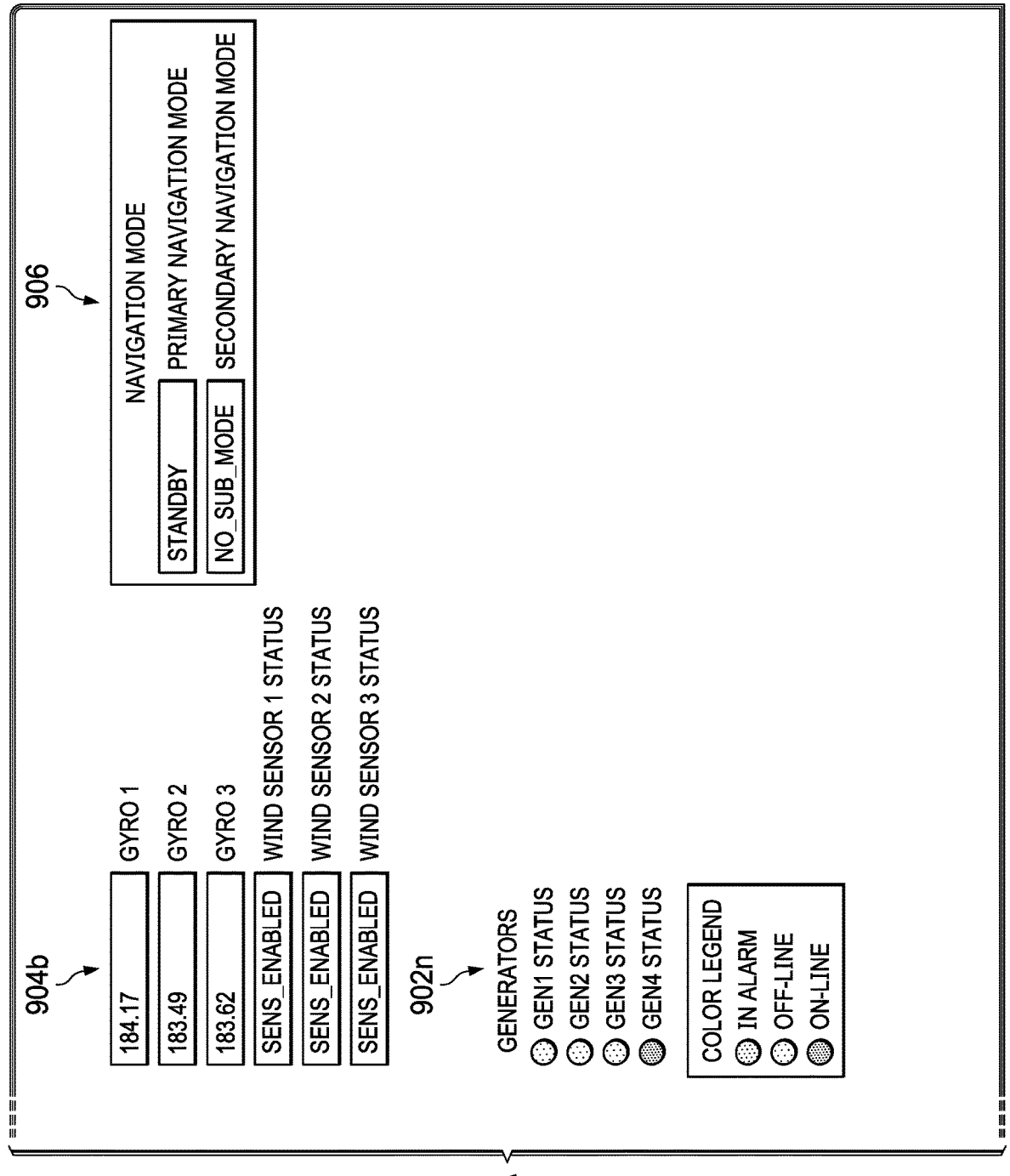

With regard to FIG. 9, an illustration of an illustrative status indicator and dashboard user interface 900 of a vessel system for operating a vessel is shown. The status indicator and dashboard user interface 900 may include one or more lists of various systems and subsystems 902a-902n (collectively 902) that are color-coded, including green for "on-line," blue for "off-line," and red for "in alarm," to indicate to an operator whether or not any problems or predicted problems exist with the vessel system. The checklist may be configured to expand hierarchically so that the operator may "drill down" to see specifically what variables associated with what system or subsystem may be trending toward or currently at a notification or alert status. It should be understood that a wide range of user interface designs may be utilized to provide status information to the operator may be utilized. The presentation of vessel systems may be configurable for and/or by an end user, as desired.

The user interface 900 may also include more conventional dashboard elements, including one or more lists of sensors 904a and 904b (collectively 904), which may include digital GPS sensor(s), scanners, heading compass, voltage sensors, gyroscope sensors, or otherwise. A navigation mode list 906 may also be displayed on the user interface 900. It should be understood that the (i) lists 902, 904, and 906, (ii) items on the lists 902, 904, and 906, and (iii) formats of the lists and user interface 900 are illustrative, and that any other lists, parameters or variables, and formats may be utilized in accordance with the principles described herein.

Figure 10:
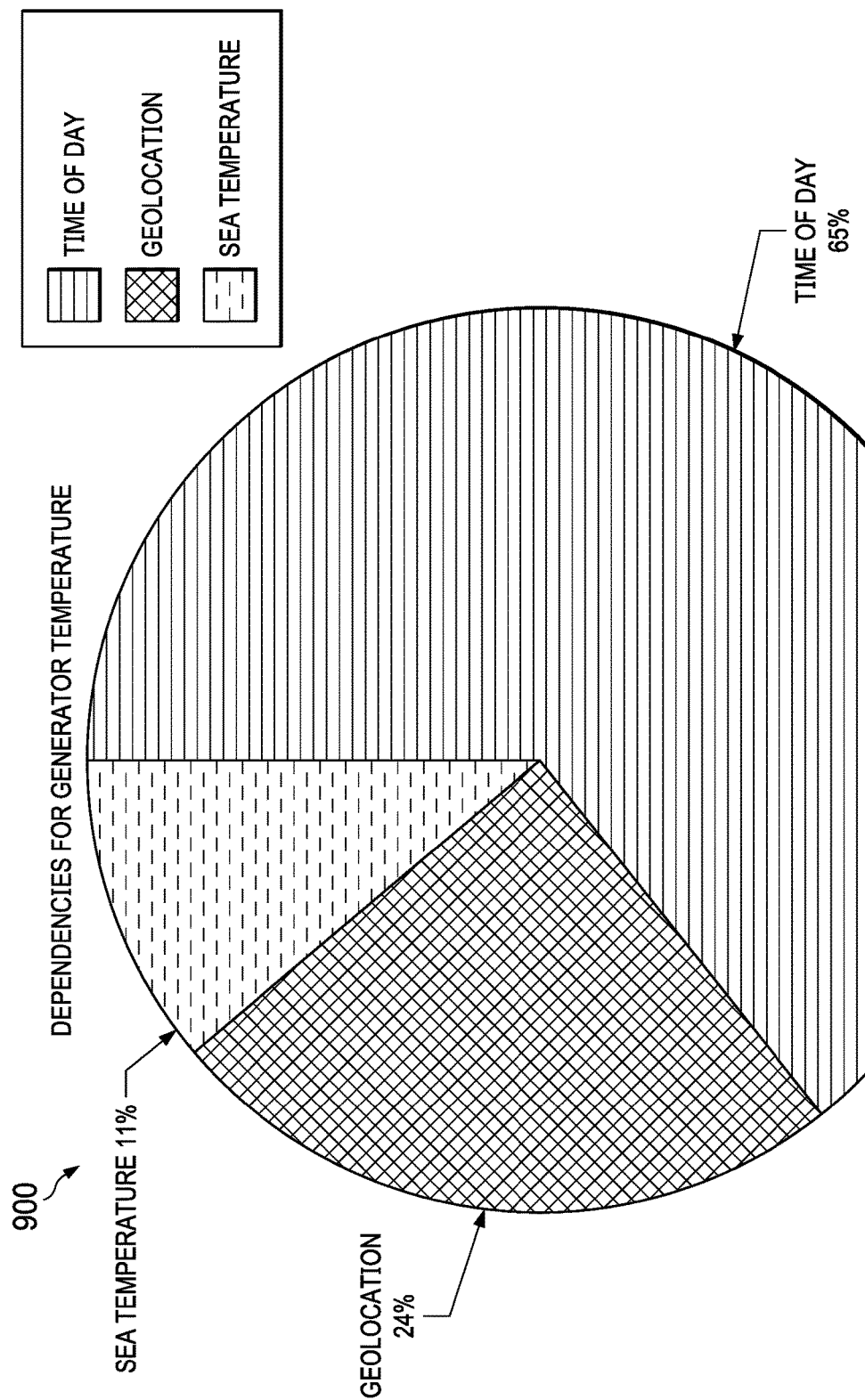
FIG. 10 is an illustration of an illustrative graph showing dependencies for a generator temperature of a vessel system for operating a vessel.

With regard to FIG. 10, a chart, in this case a pie chart, that shows illustrative variables that describes how the dependencies and correlations may be illustrated on a vessel system website. As shown, the primary variable is generator temperature, and dependency variables, which are environmental parameters or variables, are sea temperature, geolocation, and time-of-day. In this example, the time-of-day variable has the strongest dependency or correlation since the generator is running more during the day as compared to the night. Note, the chart has the purpose to illustrate dependencies of non-vessel system variables, and is not based on operational correlations.

Data Points and Variables/Parameters

A vessel system may have tens, hundreds, or thousands of variables or data points that may be monitored by the advisory system. The lists below are non-exhaustive, and may be updated as additional data points are available by sensing on a vessel system. It should be understood that the list of variables may be different for different vessel systems.

As shown, eight main groups of systems and/or subsystems may be presented for data points or variables of a vessel system on a vessel. Additional and/or alternative systems or subsystems of the vessel system may be presented, as well.

Dynamic Positioning Systems (DPS)
Integrated Bridge Systems (IBS)
Thruster Control Systems (TCS)
Sensor Systems (SES)
Mechanical Systems (MES)
Power Systems (POS)
Computer and Network Systems (CNS)
External Factors (EXF)
Dynamic Positioning Systems (DPS)
The following subgroups may be monitored for DPS:
DP Check Lists
  Custom List 1 for Accepted Operation
  Custom List 2 for Accepted Operation
  ⋮
  Custom List N for Accepted Operation
DP Class
  Position Reference System (PRS) usage according to class.
  Sensor System usage according to class.
  Thruster usage according to class.
  Power according to class.
DP Performance
  Position Lost
  Heading Lost
  ...
DP Computers
  Control Computers
    Control Computer 1 (CC1)
    Control Computer 2 (CC2)
    Control Computer 3 (CC3)
  Operative Systems
    Operative System 21 (OS21)
    Operative System 22 (OS22)
    ⋮
    Operative System NM (OSNM)
  Thruster Cards
    Thruster Card 1 (TC1)
    Thruster Card 2 (TC2)
    ⋮
    Thruster Card N (TCN)
DP Network
  Network A (NET A)
  Network B (NET B)
Customer Check Lists
  Customer List 1
  Customer List 2
  ⋮
  Customer List N
Integrated Bridge Systems (IBS)
The following subgroups may be monitored for IBS:
Ballast Tanks
  Ballast Tank 1
  Ballast Tank 2
  ⋮
  Ballast Tank N
Roll Tanks
  Roll Tank 1
  Roll Tank 2
  ⋮
  Roll Tank N Fuel Tanks
  Fuel Tank 1
    Pressure
    Level
  Fuel Tank 2
    ⋮
  Fuel Tank N
Fire and Gas Systems
  Fire and Gas Systems 1
    Fire Indications
    Gas
  Fire and Gas System 2
    ⋮
  Fire and Gas System N
Firefighting Systems
  Firefighting System 1
    Pumps
    Valves
    Motors
  Firefighting System 2
    ⋮
  Firefighting System N
Non-Critical Systems
  Water Tight Doors
  Heating, Ventilation and Air Conditioning
Sensor Systems (SES)
The following subgroups may be monitored for SES:
Global Reference Systems
  Global Reference System 1/GNSS Receiver 1/DGNSS Receiver 1/ . . .
    Position
    Velocity
    Overall System Error/Figure of Merit
  Global Reference System 2/GNSS Receiver 2/DGNSS Receiver 2/ . . .
    ⋮
  Global Reference System N/GNSS Receiver N/DGNSS Receiver N/ . . .
  C-Nav GNSS Receiver 1
    Position
    Velocity
    Precision Indication
    Reliability Indication
    RAIM
    F-Test
    W-Test
    Overall System Error/Figure of Merit
  C-Nav GNSS Receiver 2
    ⋮
  C-Nav GNSS Receiver N
Local Reference Systems
  Local Reference System 1/Cyscan 1/Radascan 1/Origin 1/ . . .
    Position/Range and Bearing
    Overall System Error
  Local Reference System 2/Cyscan 2/Radascan 2/Origin 2/ . . .
    ⋮
  Local Reference System N/Cyscan N/Radascan N/Origin N/ . . .
North Finding Systems
  North Finding System 1/Gyrocompass 1/AHRS 1/INS/AHRS 1/ . . .
    Heading
    Heading Velocity/Rate of Turn
    Overall System Error
  North Finding System 2/Gyrocompass 2/AHRS 2/INS/AHRS 2/ . . .
    ⋮
  North Finding System N/Gyrocompass N/AHRS N/INS/AHRS N/ . . .
Motion Sensor Systems
  Motions Sensor System 1/VRU 1/MRU 1/INS 1/Slope 1/ . . .
    Roll
    Pitch
    Overall System Error
  Motions Sensor System 2/VRU 2/MRU 2/INS 2/Slope 2/ . . .
    ⋮
  Motions Sensor System N/VRU N/MRU N/INS N/Slope N/ . . .
Thruster Control Systems (TCS)
The following subgroups may be monitored for TCS:
Thrusters
  Thruster 1
  Thruster 2
  ⋮
  Thruster N
Variable Frequency Drives
  Variable Frequency Drive 1 (VFD1)
  Variable Frequency Drive 2 (VFD2)
  ⋮
  Variable Frequency Drive N (VFDN)
Pumps
  Steering Pump 1
  Steering Pump 2
  ⋮
  Steering Pump N
Computers
  Thruster Control System Control Computers
    Thruster Control System Control Computer 1 (TCSCC1)
    Thruster Control System Control Computer 2 (TCSCC2)
    Thruster Control System Control Computer 3 (TCSCC3)
  Operative Systems
    Operative System 21 (OS21)
    Operative System 22 (OS22)
    Operative System 23 (OS23)
    Operative System 31 (OS31)
    ⋮
  Gateways
    Gateway 1 (GW1)
    Gateway 2 (GW2)
    ⋮
    Gateway N (GWN)
  Thruster Cards
    Thruster Card 1 (TC1)
    Thruster Card 2 (TC2)
    ⋮
    Thruster Card N (TCN)
Mechanical Systems (MES)
The following subgroups may be monitored for MES:
Thrusters
  Thruster 1
    RPM
    Winding Temperatures
    Bearing Temperatures
    Bearing Vibration
    Internal Gear Vibratione Thruster 2
⋮
Thruster N
Engines and Motors
  Main Engines
    Main Engine 1
      Bearing monitoring (BeCOMS)
      Combustion Pressure Monitoring (BeCOMS/Pressure Sensor)
      Splash Oil & Oil Mist Monitoring (SiCOMS/OCom)
      Combustion Temperature
      Lube Oil Condition Sensor (Conductivity)
      Lube Oil Temperature
      Cooling Water Temperature
      RPM
      Load
    Main Engine 2
    ⋮
    Main Engine N
  Diesel Electric Engines
    Diesel Electric Engine 1
      Bearing monitoring (BeCOMS)
      Combustion Pressure Monitoring (BeCOMS/Pressure Sensor)
      Splash Oil & Oil Mist Monitoring (SiCOMS/OCom)
      Combustion Temperature
      Lube Oil Condition Sensor (Conductivity)
      Lube Oil Temperature
      Cooling Water Temperature
      RPM
      Load
    Diesel Electric Engine 2
    ⋮
    Diesel Electric Engine N
  Electric Motor
    Electric Motor 1
      Bearing Vibration
      Bearing Temperature
      Heater ON or OFF
      Winding Temperature
      RPM
      Load
    Electric Motor 2
    ⋮
    Electric Motor N
Bearings
  Bearing 1
    Temperature
    Vibration
  Bearing 2
  ⋮
  Bearing N
Valves
  Valve 1
    Ultrasound
    Position
  Valve 2
  ⋮
  Valve N
Pumps
  Pump 1
    Bearing Vibration
    Bearing Temperature
    Pressure
    Flow
  Pump 2
  ⋮
  Pump N
Gearboxes
  Gearbox 1
    Bearing Vibration
    Bearing Temperature
    Gear Teeth and Mesh Vibration
    Lube Oil Quality/Conductivity
    Lube Oil Temperature
  Gearbox 2
  ⋮
  Gearbox N
Cranes
  Crane 1
    Hydraulic Pumps
    Hydraulic Filters
    Hydraulic Valves
    Hydraulic Reservoir
    Hydraulic Motors
    Gears
    Encoders
    Electric Motors
    Electric Heaters
    Pressure
    Speed
    Load
  Crane 2
  ⋮
  Crane N
Shaft Lines
  Shaft Line 1
    Bearing Vibration
    Alignment Vibration
    Bearing Temperature
    Torsional Shaft Vibration
    Power
    Fuel Consumption
    Strain Gauge
  Shaft Line 2
  ⋮
  Shaft Line N
Winches
  Winch 1
    Hydraulic Motor
    Hydraulic Valves
    Hydraulic Pressure
    Gears
    Encoders
    RPM
    Encoder
  Winch 2
  ⋮
  Winch N
Hydraulics
  Hydraulic 1
    Pumps
      Pump 1
        Bearing Vibration
        Bearing Temperature
        Pressure
        Calculated Flow
        Flowmeter
        Pump Angle Transducer
        Calculated Hydraulic Power
        LS Pressure Transmitter
        Oil Temperature Pump 2
⋮
Pump N
Valves
  Valve 1
    Input Signal
    Position Feedback
    Calculated Valve Response
  Valve 2
  ⋮
  Valve N
Filters
  Filter 1
    Delta Pressure/Switch for High Pressure Filters
    Delta Pressure/Switch for Return Filters
    Delta Pressure/Switch for Drain Filters
  Filter 2
  ⋮
  Filter N
Oil Reservoirs
  Oil Reservoir 1
    Level
    Temperature
    Particle Counting
    Relative Humidity
  Oil Reservoir 2
  ⋮
  Oil Reservoir N
Motors
  Motor 1
    Bearing Vibration
    Bearing Temperature
    Oil Pressure
    Oil Flow
    Oil Temperature
    Motor Angle
    Calculated Hydraulic Power
    LS Pressure
  Motor 2
  ⋮
  Motor N
Hydraulic 2
⋮
Hydraulic N
Power Systems (POS)
The following subgroups may be monitored for POS:
Generators
  Generator 1
    RPM
    Frequency
    Breaker
    Bearing Temperature
    Bearing Vibration
    Vibrations
    Bearings
    Oil Pressure
    Air Pressure
  Generator 2
  ⋮
  Generator N
Variable Frequency Drives
  Variable Frequency Drive 1 (VFD1)
  Variable Frequency Drive 2 (VFD2)
  ⋮
  Variable Frequency Drive N (VFDN)
Switchboards
  Switchboard 1 (SWBD1)
    Frequency
    Breaker
  Switchboard 2 (SWBD2)
  ⋮
  Switchboard N (SWBDN)
Grounding Systems
High Voltage Systems
Low Voltage Systems
Universal Power Supplies
  Universal Power Supply 1
  Universal Power Supply 2
  ⋮
  Universal Power Supply N
Batteries
  Battery 1
  Battery 2
  ⋮
  Battery N
Computer and Network Systems (CNS)

Utilizing the Simple Network Management Protocol (SNMP) and an optional private SNMP service, complete network and computer monitoring may be possible. The private SNMP service may be a service installed on selected computers to collect health information from computers and smart switches on the network. Every Control Computer (CC), Operative System (OS) and smart switch throughout an entire control network may be monitored, thereby providing complete monitoring of a vessel system.

The following subgroups may be monitored for CNS:
Control Computers and Operative Systems
  DP Control Computer 1 (DPCC1)
    System
      Uptime
      Date
      Description
      Contact
      Name
      Location
    Storage and Memory
      Size
      Used
    CPU
      Non-Idle time for each core
    Network
      IP Address
      MAC Address
      Unicast
        Packages In
        Packages Out
      Non-Unicast packages
        Packages In
        Packages Out
      Operational Interface Status
      Discarded and Error Packages
    Software
      Names
      CPU Usage
      Memory Usage
  DP Control Computer 2 (DPCC2)
  DP Control Computer 3 (DPCC3)
  TCS Control Computer 1 (TCSCC1)
  TCS Control Computer 2 (TCSCC2)
  TCS Control Computer 3 (TCSCC3)

Figure 11:
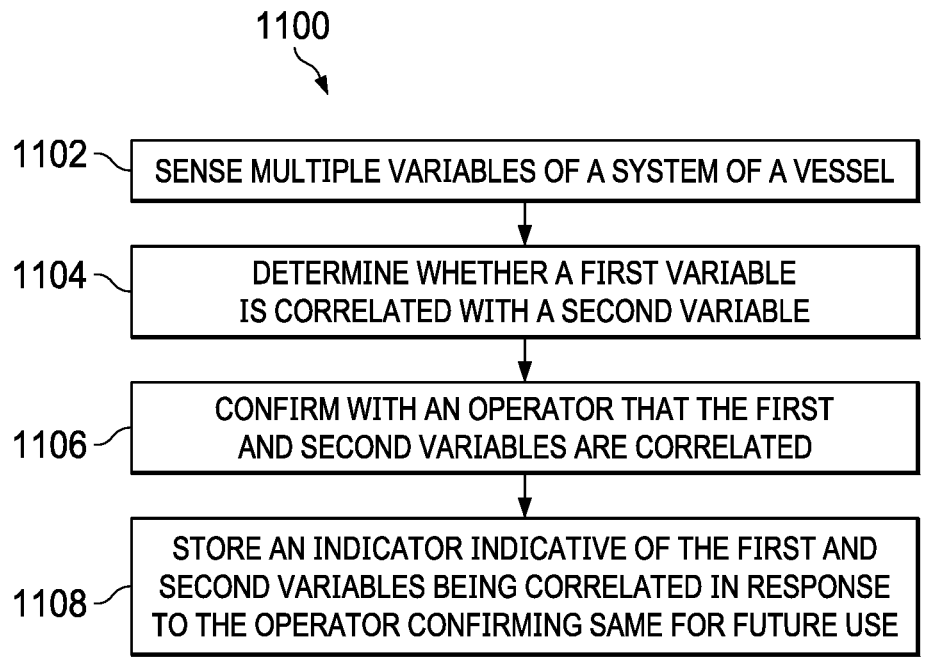
FIG. 11 is a flow diagram of an illustrative advisory process for supporting an operator of a vessel.

Operative System 1 (OS1)
Operative System 2 (OS2)
⋮
Operative System N (OSN)
Smart Switches
  Smart Switch 1
    System
      Uptime
      Date
      Description
      Contact
      Name
      Location
    Network
      IP Address
      MAC Address
      Unicast
        Packages In
        Packages Out
      Non-Unicast packages
        Packages In
        Packages Out
      Interface Status
      Discarded Packages
      Error Packages
  Power over Ethernet (PoE) Status
  Smart Switch 2
  ⋮
  Smart Switch N
External Factors (EXF)
The following variables may be monitored for EXF:
Time and Date
Geolocation
Air Humidity
Air and Sea Temperature
Wind, Waves and Currents
Weather and Climate
Sun Flares With regard to FIG. 11, a flow diagram of an illustrative advisory process 1100 of an advisory system for supporting an operator of a vessel is shown. The process 1100 may start at step 1102, where multiple variables of a system of a vessel may be sensed. The system may be any system or subsystem on the vessel capable of being sensed by a sensor. In an embodiment, the sensing may be of an environmental parameter, such as water or air temperature. Alternatively, the sensing may be of any operational parameter, such as temperature, pressure, electric current or voltage, or other variable or parameters of a vessel system. At step 1104, a determination as to whether a first variable is correlated with a second variable may be made. At step 1106, an operator that the first and second variables are correlated may be confirmed. At step 1108, an indicator indicative of the first and second variables being correlated in response to the operator confirming same may be stored for future use. The process 1100 operates as a machine learning process inclusive of human training of the advisory system by a human operator who instinctively knows whether particular variables are correlated with one another or not. Over time, the process 1100 learns which variables are correlated with one another so that the amount of human operator support or interaction with monitoring the vessel system may decrease, and a reduction of false positives and false negatives reported to the operator occurs.

More specifically, one embodiment of a process of operating a vessel may include sensing variables of a system, where the variables may be representative of functional parameters of the system. A change in values of a first variable over a time period may be identified. In response to determining the change in values of the first variable, the first variable may be correlated with a second variable that has a change in values over at least a portion of the time period. A notification inclusive of the first and second variables and change in values thereof may be generated for an operator to indicate whether the first and second variables are to be correlated with one another. In response to receiving an indication from the operator that the first and second variables are to be correlated with one another, an indicator indicative of the first and second variables being correlated with one another may be stored. Otherwise, an indicator of the first and second variable not being correlated with one another may be stored. Thereafter, in response to identifying a change in values of the first and second variables, a determination as to whether an indicator exists that is indicative with the first and second variable being correlated with one another may be made, and if so, a notice for the operator of the changing values of the first and second variables may be generated. Otherwise, a notice for the operator of the change in values of the first and second variables may not be generated.

The process may further include (i) sampling values of the first variable over a nominal value sampling time period, (ii) sampling values of the second variable over the nominal value sampling time period, and (iii) establishing a set of nominal values for each of the first and second variables. In an embodiment, the process may further include establishing a notification threshold level at which a notification is to be sent to the operator of the variable crossing the threshold level.

The process may further include calculating a prediction as to whether the first variable is going to cross the notification threshold level. In an embodiment, the process may calculate when the first variable will cross the threshold level. Calculating a prediction may include performing a regression calculation. Calculating may include executing a model of the first variable. Correlating the first variable with a second variable may include correlating the first variable with an environmental parameter. Correlating the first variable with a second variable may include correlating the first variable with another variable being sensed on the vessel.

Identifying the change in values of the first and second variables may include determining whether the change in values of the first and second variables changed with a same or similar pattern as previously changed to which the operator indicated that the first and second variables were correlated with one another. The process may further include executing an outlier rejection filter to filter outlier values of the first and second variables. The process may further include correlating the first variable with all other variables to identify the second variable. Identifying the change in values of the first variable may include identifying that the change in values is outside of a standard deviation threshold level.

In an embodiment, another system may be used to collect information (e.g., correlated variables) produced on independent vessels. The collected information may be on shore on a communications network, and be used to execute correlations on the collected information on a fleet of vessels, thereby producing fleet level correlations (e.g., failures that occur in water temperatures below a certain temperature). The on shore system may operate in the same or similar manner as the vessel system in terms of confirming with a user as to whether or not correlations between different variables identified by the onshore system are actually related and relevant. If so, then the onshore system may continue monitoring for and reporting future situations that are the same or similar (mathematically calculated). Otherwise, the onshore system may continue monitoring for but avoid reporting situations that are the same or similar.

Figure 12:
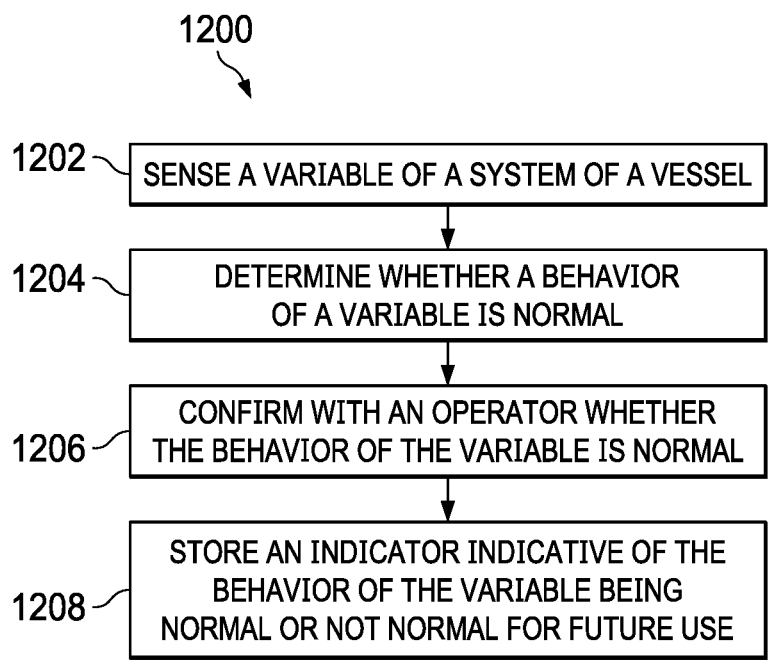
FIG. 12 is a flow diagram of another illustrative advisory process for supporting an operator of a vessel.

With regard to FIG. 12, a flow diagram of an illustrative advisory process 1200 of an advisory system for supporting an operator of a vessel is shown. The process 1200 may start at step 1202, where one or more variables of a system of a vessel may be sensed. The system may be any system or subsystem on the vessel capable of being sensed by a sensor. The sensing may be of any operational parameter, such as temperature, pressure, electric current or voltage, or other variable or parameters of a vessel system. The sensing may additionally or alternatively be of an environmental parameter, such as water or air temperature. At step 1204, a determination as to whether a behavior of a variable is normal (e.g., within defined normal operational levels) may be made. At step 1206, an operator may confirm whether the behavior (e.g., trending) of the variable is normal. At step 1208, an indicator indicative of the variable being normal or not normal may be stored for future use. The process 1200 operates as a machine learning process inclusive of human training of the advisory system by a human operator who instinctively knows whether particular variables, and optionally related variables, are operating normally or not. Over time, the process 1200 learns whether variables are operating in normal and non-normal manners so that the amount of human operator support or interaction with monitoring the vessel system may decrease, and a reduction of reporting false positives and false negatives to the operator occurs. The process 1200 may also enable a human operator to provide feedback to the system as to information about dependencies of other variables might exist to assist the machine learning of the vessel system to better determine operation of the vessel system.

One embodiment of a method of operating a vessel may include identifying a first trending change of sampled values over a first time period of a variable, where the variable may be representative of a functional parameter of the vessel. In response to determining the first trending change of sampled values of the variable, a notification inclusive of an indication of the first trending change of sampled values of the variable may be generated. The notification inclusive of the indication of the first trending change of sampled values of the variable may be communicated to an operator. The communication may be performed in any manner, such as displaying on a user interface of an operator console, as previously described herein. In response to receiving an indication from the operator as to whether the first trending change of sampled values of the variable is normal, a first indicator indicative of the first trending change of sampled values of the variable being normal may be stored for future use. Otherwise, in response to receiving an indication from the operator that the first trending change of sampled values of the variable is not normal, a second indicator indicative of the first trending change of sampled values of the variable not being normal may be stored for future use.

Furthermore, in response to identifying a second trending change of sampled values of the variable over a second time period, a determination as to whether the first or second indicator exists that is indicative of the first trending change of sampled values being normal or not normal may be made, and, if the second indicator exists, a notice may be generated for the operator of the second trending change of sampled values of the variable. Otherwise, if the first indicator exists, no notice may be generated for the operator of the second trending change of sampled values of the variable.

Identification of a first trending change of sampled values of a variable may include calculating a linear trend line as a function of sampled values. The process may further include computing an amount of time that the variable will cross a threshold value if the linear trend line continues until a first notification threshold level is reached.

Although the vessel system and processes described herein generally refer to marine vessels, it should be understood that the systems and processes may be applied to non-marine vessels. For example, rather than a vessel, the system may be any other vehicle (e.g., airplanes, trains, automobiles, etc.) or non-vehicle (e.g., manufacturing facility) that has systems and subsystems that utilize a monitoring system. The use of the machine-learning advisory system in any other environment may provide for the same or similar ability to monitor multiple variables and correlate the variables over time to help ensure that operators are able to more efficiently track changes that may result in notifications and warnings that may occur, thereby reducing downtime or catastrophic events.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. An advisory system for operating a vessel, comprising:
at least one system configured to operate the vessel;
a plurality of sensors configured to sense variables of the at least one system, the variables representative of functional parameters of the at least one system;
a processing unit in communication with the at least one system and said sensors, and configured to:
identify a change in values of a first variable over a time period;
in response to determining the change in values of the first variable, correlate the first variable with a second variable that has a change in values over at least a portion of the time period;
generate a notification inclusive of the first and second variables and change in values thereof for an operator to indicate whether the first and second variables are to be correlated with one another; and
in response to receiving an indication from the operator that the first and second variables are to be correlated with one another,
store an indicator indicative of the first and second variables being correlated with one another,
otherwise, store an indicator of the first and second variable not being correlated with one another.

2. The advisory system according to claim 1, wherein said processing unit, in response to identifying another change in values of either the first or second variables that exhibit similar behavior as previously determined, further being configured to determine whether an indicator exists that is indicative with the first and second variable being correlated with one another, and,
if so, generate a notice for the operator of the changing values of the first and second variables,
otherwise, not generate a notice for the operator of the change in values of the first and second variables.

3. The advisory system according to claim 1, wherein said processing unit is further configured to:
sample values of the first variable over a nominal value sampling time period;
sample values of the second variable over the nominal value sampling time period; and
establish a set of nominal values for each of the first and second variables.

4. The advisory system according to claim 1, wherein said processing unit is further configured to establish a notification threshold level at which a notification is to be sent to the operator of the variable crossing the threshold level.

5. The advisory system according to claim 4, wherein said processing unit is further configured to calculate a prediction as to whether the first variable is going to cross the notification threshold level.

6. The advisory system according to claim 5, wherein said processing unit is further configured to calculate when the first variable will cross the threshold level.

7. The advisory system according to claim 5, wherein the calculation is a regression calculation.

8. The advisory system according to claim 5, wherein the calculation is based on a model of the first variable.

9. The advisory system according to claim 1, wherein the second variable is an environmental parameter.

10. The advisory system according to claim 1, wherein the second variable is another variable of the system being sensed by sensors.

11. The advisory system according to claim 1, wherein said processing unit, in identifying the change in values of the first and second variables, includes determining whether the change in values of the first and second variables changed with a same or similar pattern as previously changed to which the operator indicated that the first and second variables were correlated with one another.

12. The advisory system according to claim 1, wherein said processing unit is further configured to execute an outlier rejection filter to filter outlier values of the first and second variables.

13. The advisory system according to claim 1, wherein said processing unit is further configured to correlate the first variable with all other variables to identify the second variable.

14. The advisory system according to claim 13, wherein said processing unit, in identifying the change in values of the first variable, is further configured to identify that the change in values is outside of a standard deviation threshold level.

15. A method of operating a vessel, comprising:
sensing, by sensors, variables of a system, the variables representative of functional parameters of the system;

identifying a change in values of a first variable over a time period;

in response to determining the change in values of the first variable, correlating, by a processor, the first variable with a second variable that has a change in values over at least a portion of the time period;

generating a notification inclusive of the first and second variables and change in values thereof for an operator to indicate whether the first and second variables are to be correlated with one another; and in response to receiving an indication from the operator via a communications network that the first and second variables are to be correlated with one another, storing, in a non-transitory memory, an indicator indicative of the first and second variables being correlated with one another, otherwise, storing, in the non-transitory memory, an indicator of the first and second variable not being correlated with one another.

16. The method according to claim 15, further comprising, in response to identifying another change in values of either the first or second variables that exhibit similar behavior as previously determined, further being configured to determine whether an indicator exists that is indicative with the first and second variable being correlated with one another, and, if so, generating a notice for the operator of the changing values of the first and second variables, otherwise, not generating a notice for the operator of the change in values of the first and second variables.

17. The method according to claim 15, further comprising:

sampling values of the first variable over a nominal value sampling time period;

sampling values of the second variable over the nominal value sampling time period; and establishing a set of nominal values for each of the first and second variables.

18. The method according to claim 15, further comprising establishing a notification threshold level at which a notification is to be sent to the operator of the variable crossing the threshold level.

19. The method according to claim 18, further comprising calculating a prediction as to whether the first variable is going to cross the notification threshold level.

20. The method according to claim 19, further comprising calculating when the first variable will cross the threshold level.

21. The method according to claim 19, wherein calculating a prediction includes performing a regression calculation.

22. The method according to claim 19, wherein calculating includes executing a model of the first variable.

23. The method according to claim 15, wherein correlating the first variable with a second variable includes correlating the first variable with an environmental parameter.

24. The method according to claim 15, wherein correlating the first variable with a second variable includes correlating the first variable with another variable being sensed on the vessel.

25. The method according to claim 15, wherein identifying the change in values of the first and second variables includes determining whether the change in values of the first and second variables changed with a same or similar pattern as previously changed to which the operator indicated that the first and second variables were correlated with one another.

26. The method according to claim 15, further comprising executing an outlier rejection filter to filter outlier values of the first and second variables.

27. The method according to claim 15, further comprising correlating the first variable with all other variables to identify the second variable.

28. The method according to claim 27, wherein identifying the change in values of the first variable includes identifying that the change in values is outside of a standard deviation threshold level.

29. A method of operating a vessel, comprising:

identifying, by a processor, a first trending change of sampled values over a first time period of a variable, the variable representative of a functional parameter of the vessel;

in response to the processor determining the first trending change of sampled values of the variable, generating a notification inclusive of an indication of the first trending change of sampled values of the variable;

communicating the notification inclusive of the indication of the first trending change of sampled values of the variable to an operator via a communications network;

in response to receiving an indication from the operator as to whether the first trending change of sampled values of the variable is normal, storing, in a non-transitory memory, a first indicator indicative of the first trending change of sampled values of the variable being normal for future use, otherwise, in response to receiving an indication from the operator that the first trending change of sampled values of the variable is not normal, storing, in the non-transitory memory, a second indicator indicative of the first trending change of sampled values of the variable not being normal for future use.

30. The method according to claim 29, further comprising, in response to identifying a second trending change of sampled values of the variable over a second time period, determining whether the first or second indicator exists that is indicative of the first trending change of sampled values being normal or not normal, and, if the second indicator exists, generating a notice for the operator of the second trending change of sampled values of the variable, otherwise, if the first indicator exists, not generating a notice for the operator of the second trending change of sampled values of the variable.

31. The method according to claim 29, wherein identifying a first trending change of sampled values of a variable includes calculating a linear trend line as a function of sampled values.

32. The method according to claim 31, further comprising computing an amount of time that the variable will cross a threshold value if the linear trend line continues until a first notification threshold level is reached.

* * * * *